United States Patent
Li

(10) Patent No.: US 12,381,790 B2
(45) Date of Patent: Aug. 5, 2025

(54) DATA OBTAINING METHOD AND SYSTEM, AND APPARATUS THEREOF

(71) Applicant: HUAWEI TECHNOLOGIES CO., LTD., Shenzhen (CN)

(72) Inventor: Zhuoming Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/500,491

(22) Filed: Nov. 2, 2023

(65) Prior Publication Data
US 2024/0064069 A1 Feb. 22, 2024

Related U.S. Application Data

(63) Continuation of application No. PCT/CN2022/088689, filed on Apr. 24, 2022.

(30) Foreign Application Priority Data

May 6, 2021 (CN) ...................... 2021104943183.X

(51) Int. Cl.
*H04L 41/5009* (2022.01)
*H04L 43/065* (2022.01)
*H04L 43/0817* (2022.01)

(52) U.S. Cl.
CPC ........ *H04L 41/5009* (2013.01); *H04L 43/065* (2013.01); *H04L 43/0817* (2013.01)

(58) Field of Classification Search
CPC  H04L 41/5009; H04L 43/065; H04L 43/0817
USPC ....................................................... 709/224
See application file for complete search history.

(56) References Cited

U.S. PATENT DOCUMENTS

| | | | | |
|---|---|---|---|---|
| 2020/0329422 | A1* | 10/2020 | Sirotkin | H04W 48/18 |
| 2021/0368427 | A1* | 11/2021 | Rommer | H04W 48/16 |
| 2023/0388859 | A1* | 11/2023 | Bulakci | H04W 24/00 |
| 2023/0403543 | A1* | 12/2023 | Pateromichelakis | H04L 41/0686 |

FOREIGN PATENT DOCUMENTS

| | | | | |
|---|---|---|---|---|
| CN | 111836291 A | 10/2020 | | |
| CN | 112350841 A | 2/2021 | | |
| WO | WO-2017018460 A1 * | 2/2017 | ............ | H04W 28/08 |

(Continued)

OTHER PUBLICATIONS

3GPP TS 23.288 V17.0.0 (Mar. 2021),3rd Generation Partnership Project; Technical Specification Group Services and System Aspects;Architecture enhancements for 5G System (5GS) to support network data analytics services (Release 17), total 159 pages.

(Continued)

*Primary Examiner* — Lan Dai T Truong
(74) *Attorney, Agent, or Firm* — HAUPTMAN HAM, LLP

(57) ABSTRACT

A data obtaining method and system, and an apparatus thereof. A network data analytics network element determines a data source to which to-be-obtained data belongs. Based on first information, an object identifier that is of the data source and that is in an operation, administration, and maintenance OAM system is determined. The network element sends a first request to the OAM system. The first request includes the object identifier. The first request is for requesting to obtain the to-be-obtained data.

20 Claims, 6 Drawing Sheets

(56) References Cited

FOREIGN PATENT DOCUMENTS

| WO | 2020062097 A1 | 4/2020 | | |
|---|---|---|---|---|
| WO | 2021004859 A1 | 1/2021 | | |
| WO | WO-2021047359 A1 | * | 3/2021 | ............ G01C 21/30 |
| WO | WO-2021195170 A1 | * | 9/2021 | ........... G01S 5/0036 |
| WO | WO-2022151367 A1 | * | 7/2022 | |

OTHER PUBLICATIONS

3GPP TSG-SA5 Meeting #137e;S5-213373 "TD enhance 5GC Nrm to support plug and play of 5GC NF"(Nokia Shanghai Bell) May 10-19, 2021;total 2 pages.

3GPP TS 32.158 V16.2.0(Dec. 2020), 3rd Generation Partnership Project; Technical Specification Group Services and System Aspects; Management and orchestration; Design rules for REpresentational State Transfer (REST) Solution Sets (SS)(Release 16)total 40 pages.

3GPP TS 28.532 V16.7.1 (Apr. 2021),3rd Generation Partnership Project; Technical Specification Group Services and System Aspects; Management and orchestration; Generic management services;(Release 16), total 222 pages.

3GPP TR 23.700-91 V17.0.0 (Dec. 2020),3rd Generation Partnership Project; Technical Specification Group Services and System Aspects; Study on enablers for network automation for the5G System (5GS); Phase 2(Release 17)total 382 pages.

3GPP TS 28.541 V16.8.0 (Mar. 2021),3rd Generation Partnership Project; Technical Specification Group Services and System Aspects; Management and orchestration; 5G Network Resource Model (NRM); Stage 2 and stage 3(Release 16) total 448 pages.

3GPP TSG-WG SA2 Meeting #141;S2-2008034;"LS on Slice information collection"; Oct. 12-23, 2020;total 1 pages.

3GPP TSG-SA5 Meeting #134; S5-206299;"Reply LS on Slice Information collection" Nov. 16-25, 2020,total 2 pages.

SA WG2 Meeting #S2-143E;S2-2100047;"Reply LS on Slice Information collection" Feb. 24,-Mar. 9, 2021, total 2 pages.

Chinese Office Action issued in corresponding Chinese Application No. 202110494318.X, dated Apr. 20, 2023, pp. 1-9.

International Search Report issued in corresponding International Application No. PCT/CN2022/088689, dated Jul. 28, 2022, pp. 1-10.

Extended European Search Report issued in corresponding European Application No. 22798585.0, dated Aug. 22, 2024, pp. 1-10.

* cited by examiner

DATA OBTAINING METHOD AND SYSTEM, AND APPARATUS THEREOF

CROSS-REFERENCE TO RELATED APPLICATIONS

This application is a continuation International Application No. PCT/CN2022/088689, filed on Apr. 24, 2022, which claims priority to Chinese Patent Application No. 202110494318.X, filed on May 6, 2021. The disclosures of the aforementioned applications are incorporated herein by reference in these entireties.

BACKGROUND

An operation, administration, and maintenance (OAM) system is configured to analyze, predict, plan, configure, test, and perform fault management on a network and a service. The OAM system performs the foregoing management operation and maintenance operation on the network and the service, and generates a large amount of data about the network and the service.

Currently, in response to an NWDAF obtaining data of a managed object in the OAM system, the NWDAF is to have an entire database of managed objects of the OAM system. As a result, a process in which the NWDAF obtains the data of the managed object from the OAM system is complex.

SUMMARY

Embodiments described herein provide a data obtaining method and system, and an apparatus thereof, to simplify a process in which an NWDAF obtains data of a managed object from an OAM system.

According to a first aspect, at least one embodiment provides a data obtaining method. An execution body of the method is a network data analytics network element, or is a chip used in the network data analytics network element. The method includes: The network data analytics network element determines a data source to which to-be-obtained data belongs; obtains first information, where the first information is for determining an object identifier that is of the data source and that is in an OAM system; determines, based on the first information, the object identifier that is of the data source and that is in the operation, administration, and maintenance OAM system; and sends a first request to the OAM system. The first request includes the object identifier, and the first request is for requesting to obtain the to-be-obtained data. The first information is for associating an identifier of the data source with the object identifier that is of the data source and that is in the OAM system, or is for associating a domain name of the data source with the object identifier that is of the data source and that is in the OAM system. The first information is also referred to as association information.

In this technical solution, the network data analytics network element determines, based on the first information, the object identifier that is of the data source and that is in the OAM system. In this manner, the network data analytics network element does not obtain an entire database of managed objects of the OAM system, so that a process in which the network data analytics network element obtains data from the OAM system is simplified.

In an implementation, the first information includes a correspondence between an identifier of the data source and the object identifier that is of the data source and that is in the OAM system.

In this technical solution, the object identifier that is of the data source and that is in the OAM system is obtained by querying the correspondence, so that the process in which the network data analytics network element obtains the data from the OAM system is simplified.

In an implementation, the data source includes a network slice or a network slice subnet.

In an implementation, the first information is included in a network function profile. The network function profile includes one or more of the following: a correspondence between an identifier of the network slice and an object identifier that is of the network slice and that is in the OAM system; a correspondence between an identifier of the network slice and an object identifier that is of the network slice subnet in the network slice and that is in the OAM system; a correspondence between an identifier of the network slice subnet in the network slice and an object identifier that is of the network slice and that is in the OAM system; or a correspondence between an identifier of the network slice subnet in the network slice and an object identifier that is of the network slice subnet and that is in the OAM system.

In an implementation, the to-be-obtained data is a key performance indicator KPI of the network slice or a KPI of the network slice subnet.

In an implementation, the first information includes a generation rule of the object identifier that is of the data source and that is in the OAM system. A specific implementation in which the network data analytics network element determines, based on the first information, the object identifier that is of the data source and that is in the OAM system is: The network data analytics network element generates, based on the generation rule and an identifier of the data source, the object identifier that is of the data source and that is in the OAM system.

In this technical solution, in response to the data source being a network slice or a network slice subnet, even in response to a network slice or a network slice subnet being newly added, an object identifier that is of the (newly added) network slice or network slice subnet and that is in the OAM system is generated based on the historically obtained generation rule.

In an implementation, the object identifier includes a first identifier and a second identifier, and the generation rule includes a first generation rule and a second generation rule. A specific implementation in which the network data analytics network element generates, based on the generation rule and an identifier of the data source, the object identifier that is of the data source and that is in the OAM system is: The network data analytics network element generates the first identifier based on the first generation rule and a domain name of the network data analytics network element, and generates the second identifier based on the second generation rule and the identifier of the data source.

In an implementation, an identifier of the data source includes network slice selection assistance information and/or a network slice subnet identifier. The object identifier that is of the data source and that is in the OAM system includes a managed object identifier relating to network slice managed object identifier and/or a managed object identifier relating to network slice subnet.

In an implementation, the method further includes: The network data analytics network element receives a second request, where the second request is for requesting to perform data analytics. The network data analytics network element receives the to-be-obtained data from the OAM system, and performs data analytics based on the to-be-obtained data, to obtain an analytics result. A specific implementation in which the network data analytics network element determines a data source to which to-be-obtained data belongs is: The network data analytics network element determines, based on the second request, the data source to which the to-be-obtained data belongs.

In an implementation, the second request includes an identifier of the data source.

In an implementation, the first information includes a mapping rule between a domain name of the data source and the object identifier that is of the data source and that is in the OAM system. The method further includes: The network data analytics network element obtains the domain name of the data source. A specific implementation in which the network data analytics network element determines, based on the first information, the object identifier that is of the data source and that is in the OAM system is: The network data analytics network element obtains, through mapping from the domain name of the data source according to the mapping rule, the object identifier that is of the data source and that is in the OAM system.

In an implementation, the object identifier includes a third identifier and a fourth identifier. The first information specifically includes a first mapping rule between the domain name of the data source and the third identifier and a second mapping rule between a host name of the data source and the fourth identifier. The method further includes: The network data analytics network element obtains the host name of the data source. A specific implementation in which the network data analytics network element obtains, through mapping from the domain name of the data source according to the mapping rule, the object identifier that is of the data source and that is in the OAM system is: The network data analytics network element obtains the third identifier through mapping from the domain name of the data source according to the first mapping rule, and obtains the fourth identifier through mapping from the host name of the data source according to the second mapping rule.

In an implementation, a specific implementation in which the network data analytics network element obtains the domain name of the data source is: The network data analytics network element sends a third request to a network repository function NRF network element, where the third request is for requesting to obtain the domain name of the data source, and the network data analytics network element receives the domain name of the data source from the NRF network element.

In an implementation, that the network data analytics network element obtains first information includes any one of the following: The network data analytics network element obtains the first information from the OAM system or the NRF network element; the network data analytics network element obtains a network function profile from the OAM system or the NRF network element, where the network function profile includes the first information; or the network data analytics network element obtains the first information from a memory of the network data analytics network element.

In an implementation, the network function profile is a configuration file of the network data analytics network element or a network slice selection network element.

In an implementation, the data source includes one or more of the following: a network element, an interface of the network element, or configuration data of the network element.

According to a second aspect, at least one embodiment provides another data obtaining method, used in an operation, administration, and maintenance OAM system. The system includes a management device. An execution body of the method is the management device, or is a chip used in the management device. The method includes: The management device generates first information, and sends the first information to a first network element. The first information is for determining an object identifier that is of a data source to which to-be-obtained data belongs and that is in the OAM system.

In this technical solution, the first information is sent to the first network element. The first network element is a network data analytics network element. Alternatively, the network data analytics network element obtains the first information from the first network element, so that the network data analytics network element determines, based on the first information, the object identifier that is of the data source and that is in the OAM system. In this manner, the network data analytics network element does not obtain an entire database of managed objects of the OAM system, so that a process in which the network data analytics network element obtains data from the OAM system is simplified.

In an implementation, the first information includes a correspondence between an identifier of the data source and the object identifier that is of the data source and that is in the OAM system.

In an implementation, the data source includes a network slice or a network slice subnet.

In an implementation, the first information is included in a network function profile. The network function profile includes one or more of the following: a correspondence between an identifier of the network slice and an object identifier that is of the network slice and that is in the OAM system; a correspondence between an identifier of the network slice and an object identifier that is of the network slice subnet in the network slice and that is in the OAM system; a correspondence between an identifier of the network slice subnet in the network slice and an object identifier that is of the network slice and that is in the OAM system; or a correspondence between an identifier of the network slice subnet in the network slice and an object identifier that is of the network slice subnet and that is in the OAM system.

In an implementation, the to-be-obtained data is a key performance indicator KPI of the network slice or a KPI of the network slice subnet.

In an implementation, the first information includes a generation rule of the object identifier that is of the data source and that is in the OAM system.

In an implementation, the object identifier includes a first identifier and a second identifier. The generation rule includes a first generation rule and a second generation rule. The first generation rule includes a rule of generating the first identifier based on a domain name of a network data analytics network element. The second generation rule includes a rule of generating the second identifier based on an identifier of the data source.

In an implementation, an identifier of the data source includes network slice selection assistance information and/or a network slice subnet identifier. The object identifier that is of the data source and that is in the OAM system includes a managed object identifier relating to network slice managed object identifier and/or a managed object identifier relating to network slice subnet.

In an implementation, the first information includes a mapping rule between a domain name of the data source and the object identifier that is of the data source and that is in the OAM system.

In an implementation, the object identifier includes a third identifier and a fourth identifier. The first information specifically includes a first mapping rule between the domain name of the data source and the third identifier and a second mapping rule between a host name of the data source and the fourth identifier.

In an implementation, a specific implementation in which the management device sends the first information to a first network element is: The management device sends a configuration command to the first network element, where the configuration command includes the first information. Alternatively, the management device sends network function profile to the first network element, where the network function profile includes the first information.

In an implementation, the network function profile is a configuration file of the network data analytics network element or a network slice selection network element.

In an implementation, the data source includes one or more of the following: a network element, an interface of the network element, or configuration data of the network element.

In an implementation, the first network element includes one or more of the following: the network slice selection network element, a network repository function NRF network element, or the network data analytics network element.

According to a third aspect, at least one embodiment provides a communications apparatus. The communications apparatus has a part or all of functions of implementing the network data analytics network element in the method example in the first aspect. For example, a function of the communications apparatus includes a function of a part or all of at least one embodiment, or includes a function of independently implementing at least one embodiment. The function is implemented by hardware, or is implemented by hardware executing corresponding software. The hardware or the software includes one or more units or modules corresponding to the functions.

In an implementation, a structure of the communications apparatus includes a processing unit and a communications unit. The processing unit is configured to support the communications apparatus in performing a corresponding function in the foregoing method. The communications unit is configured to support communication between the communications apparatus and another device. The communications apparatus further includes a storage unit. The storage unit is coupled to the processing unit and a sending unit, and the storage unit stores a computer program and data that are used for the communications apparatus.

In an implementation, the communications apparatus includes: a processing unit, configured to determine a data source to which to-be-obtained data belongs, obtain first information, and determine, based on the first information, an object identifier that is of the data source and that is in an operation, administration, and maintenance OAM system; and a communications unit, configured to send a first request to the OAM system, where the first request includes the object identifier, and the first request is for requesting to obtain the to-be-obtained data.

In an example, the processing unit is a processor, the communications unit is a transceiver or a communications interface, and the storage unit is a memory.

In an implementation, the communications apparatus includes: a processor, configured to determine a data source to which to-be-obtained data belongs, obtain first information, and determine, based on the first information, an object identifier that is of the data source and that is in an operation, administration, and maintenance OAM system; and a transceiver, configured to send a first request to the OAM system, where the first request includes the object identifier, and the first request is for requesting to obtain the to-be-obtained data.

According to a fourth aspect, at least one embodiment provides another communications apparatus. The communications apparatus has a part or all of functions of implementing the management device in the method example in the second aspect. For example, a function of the communications apparatus includes a function of a part or all of at least one embodiment, or includes a function of independently implementing any embodiment of at least one embodiment. The function is implemented by hardware, or is implemented by hardware executing corresponding software. The hardware or the software includes one or more units or modules corresponding to the functions.

In an implementation, a structure of the communications apparatus includes a processing unit and a communications unit. The processing unit is configured to support the communications apparatus in performing a corresponding function in the foregoing method. The communications unit is configured to support communication between the communications apparatus and another device. The communications apparatus further includes a storage unit. The storage unit is coupled to the processing unit and a sending unit, and the storage unit stores a computer program and data that are used for the communications apparatus.

In an implementation, the communications apparatus includes: a processing unit, configured to generate first information, where the first information is for determining an object identifier that is of a data source to which to-be-obtained data belongs and that is in the OAM system; and a communications unit, configured to send the first information to a first network element.

In an example, the processing unit is a processor, the communications unit is a transceiver or a communications interface, and the storage unit is a memory.

In an implementation, the communications apparatus includes: a processor, configured to generate first information, where the first information is for determining an object identifier that is of a data source to which to-be-obtained data belongs and that is in the OAM system; and a transceiver, configured to send the first information to a first network element.

According to a fifth aspect, at least one embodiment provides a data obtaining system. The system includes one or more communications apparatuses in the third aspect and the fourth aspect.

According to a sixth aspect, at least one embodiment provides a computer-readable storage medium. The computer-readable storage medium stores a computer program, the computer program includes program instructions, and in response to the program instructions being executed by a communications apparatus, the communications apparatus is enabled to perform the method in the first aspect.

According to a seventh aspect, at least one embodiment provides a computer-readable storage medium. The computer-readable storage medium stores a computer program, the computer program includes program instructions, and in response to the program instructions being executed by a communications apparatus, the communications apparatus is enabled to perform the method in the second aspect.

According to an eighth aspect, at least one embodiment further provides a computer program product including a computer program. In response to the computer program product running on a computer, the computer is enabled to perform the method in the first aspect.

According to a ninth aspect, at least one embodiment further provides a computer program product including a computer program. In response to the computer program product running on a computer, the computer is enabled to perform the method in the second aspect.

According to a tenth aspect, at least one embodiment provides a chip system. The chip system includes at least one processor and an interface, and is configured to support a network data analytics network element in implementing a function in the first aspect, for example, determining or processing at least one of data and information in the foregoing method. In at least one embodiment, the chip system further includes a memory, and the memory is configured to store a computer program and data that are used for the network data analytics network element. The chip system includes a chip, or includes a chip and another discrete component.

According to an eleventh aspect, at least one embodiment provides a chip system. The chip system includes at least one processor and an interface, and is configured to support a management device in an OAM system in implementing a function in the second aspect, for example, determining or processing at least one of data and information in the foregoing method. In at least one embodiment, the chip system further includes a memory, and the memory is configured to store a computer program and data that are used for the management device. The chip system includes a chip, or includes a chip and another discrete component.

DESCRIPTION OF EMBODIMENTS

Figure 1A:
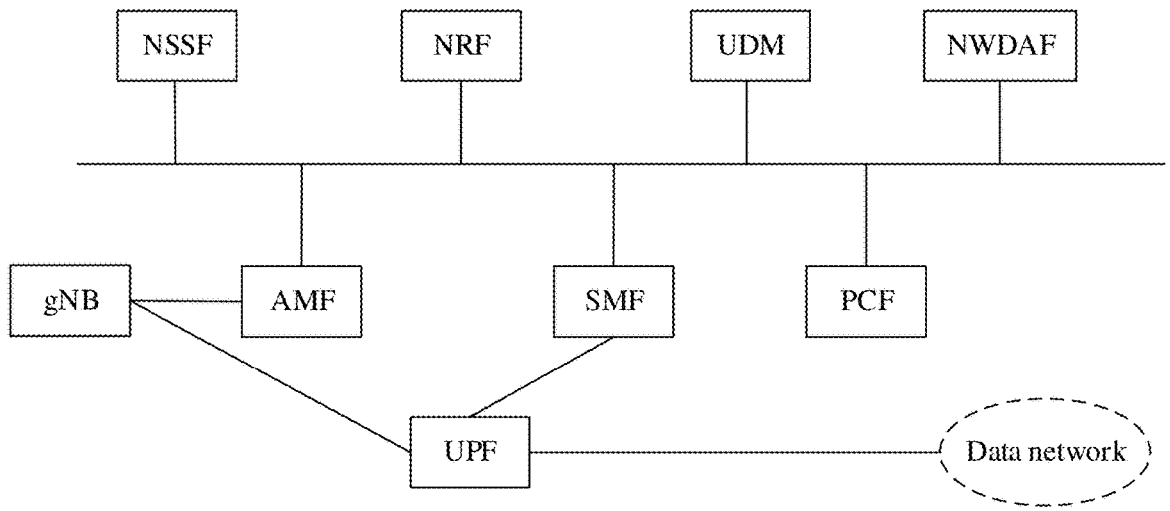
FIG. 1a is a schematic diagram of a network architecture of a 5G system.

For ease of understanding, terms involved in at least one embodiment are first described.
1. Network Architecture of a 5th Generation (5G) Communications System FIG. 1a is a schematic diagram of a network architecture of a 5G system. The architecture includes an access network (AN) and a core network.

The AN is configured to implement an access-related function, provides a network access function for an authorized user in a specific area, and determines transmission tunnels of different quality based on a user level, a service requirement, or the like, to transmit user data. The AN forwards a control signal and user data between a terminal device and the core network.

The AN includes an AN device. The AN device is a device that provides access for the terminal device, and includes a radio access network (RAN) device and an AN device. The (R) AN device is mainly responsible for functions such as radio resource management, quality of service (QoS) management, and data compression and encryption on an air interface side. The (R) AN device includes base stations in various forms, for example, a macro base station, a micro base station (which is also referred to as a small cell), a relay station, an access point, and a balloon station. A deployment form of the (R) AN device includes a central unit (CU)-distributed unit (DU) split scenario and a single-site scenario. In the split scenario, the CU supports a protocol such as radio resource control (RRC) protocol, a packet data convergence protocol (PDCP), or a service data adaptation protocol (SDAP). The DU supports a radio link control (RLC) layer protocol, a media access control (MAC) layer protocol, or a physical layer protocol. In systems using different radio access technologies, names of a device having a base station function is different. For example, in a 5G system, the device is referred to as a (R) AN or a next-generation node base station (next-generation NodeB, gNB). In a long term evolution (LTE) system, the device is referred to as an evolved NodeB (eNB or eNodeB).

The core network is responsible for maintaining subscription data of a mobile network, and provides functions such as session management, mobility management, policy management, and security authentication for user equipment (UE). The core network includes the following network elements: a network data analytics network element, a network slice selection network element, a network repository function (NRF) network element, a unified data management (UDM) network element, an access and mobility management function (AMF) network element, a user plane function (UPF) network element, a session management function (SMF) network element, a policy control function (PCF) network element, an application function (AF) network element, and a network exposure function (NEF) network element.

The network data analytics network element is configured to collect data from a network function (NF) network element and an operation, administration, and maintenance (OAM) system, and perform data analytics and/or prediction based on the obtained data. In the 5G communications system, the network data analytics network element is a network data analytics function (NWDAF) network element.

The network slice selection network element is configured to select an appropriate network slice for a service of a terminal. In the 5G communications system, the network slice selection network element is a network slice selection function (NSSF) network element.

The NRF network element mainly provides service registration, discovery, and authorization, and maintains available network function (NF) instance information, to implement on-demand configuration of a network function and a service and interconnection between NFs. The service registration means that an NF network element provides a service only after being registered with the NRF network element. The service discovery means that in response to an NF network element being served by another NF network element, the NF network element first is to perform service discovery by using the NRF network element, to discover the expected NF network element that serves the NF network element. For example, in response to an NF network element 1 being served by an NF network element 2, the NF network element 1 first is to perform service discovery by using the NRF network element, to discover the NF network element 2.

The UDM network element is configured to manage user data, for example, subscription data or authentication/authorization data.

The AMF network element is mainly responsible for mobility management in a mobile network, such as user location update, registration of a user with a network, or user switching.

The UPF network element is mainly responsible for forwarding and receiving user data. The UPF network element receives the user data from a data network, and transmit the user data to UE by using an access network device, and further receives the user data from the UE by using the access network device, and forward the user data to the data network.

The SMF network element is mainly responsible for session management in a mobile network, for example, session establishment, modification, and release. A specific function is, for example, allocating an internet protocol (IP) address to a user, or selecting a UPF that provides a packet forwarding function.

The PCF network element mainly supports providing a unified policy framework to control network behavior, and providing a policy rule for a control layer network function, and is responsible for obtaining user subscription information related to a policy decision. The PCF network element provides a policy, such as a quality of service (QOS) policy and a slice selection policy, for the AMF network element and the SMF network element. Based on layers or functions, the PCF network element is divided into a plurality of entities, for example, a global PCF and a PCF in a slice, or a session management PCF (SM-PCF) and an access management PCF (AM-PCF).

The AF network element mainly supports interaction with a 3GPP core network to provide a service, for example, affecting a data routing decision or a policy control function, or providing some third-party services for a network side.

The NEF network element is configured to perform protocol conversion on interaction between the external and the internal, for example, perform protocol conversion on interaction between a 3GPP external network element and a 3GPP internal network element (for example, the SMF network element). A 3GPP network is a network defined in the 3GPP protocol, for example, a network including an access network and a core network, such as a mobile communications network, a public land mobile network (PLMN), or a non-public network (NPN), and is a 5th generation (5th generation, 5G) communications network or a future evolved mobile communications network.

The data network (DN) is configured to provide a data transmission service for a terminal. UE accesses the data network by using an established protocol data unit (PDU) session. The data network is a public data network (PDN), such as the internet, or is a local access data network (LADN), such as a network of a mobile edge computing (MEC) node.

In the architecture shown in FIG. 1*a*, a network element in a dashed-line box is a service-oriented NF network element, an interface between NF network elements is a service-oriented interface, and an exchanged message is a service-oriented message.

2. Data Source

For each data source, management data about the data source is generated in an OAM system. In embodiments described herein, the data source includes one or more of the following: a network slice, a network slice subnet, a network element, a subnet including the network element, an interface of the network element, or configuration data of the network element. The management data of the data source is specifically performance statistics data of the network slice, the network slice subnet, or the network element, or alarm information data. In response to the data source being the interface of the network element or the configuration data of the network element, the management data is a specific value of a configuration item of the network element, or a specific value of a configuration item of the interface of the network element.

The network slice is an end-to-end logical network obtained by abstracting a physical network. One physical network is abstracted into a plurality of network slices, and the network slices are isolated and do not affect each other. The network slice is identified by using single network slice selection assistance information (S-NSSAI). A network selects a network slice for a service based on S-NSSAI carried in a service request of a terminal, and establish a packet data unit (PDU) session in the selected network slice, to transmit service data.

The network slice subnet is a radio subnet part or a core network part that forms the network slice. The radio subnet part that forms the network slice is referred to as a network slice access network subnet, and the core network part that forms the network slice is referred to as a network slice core network subnet. The network slice access network subnet is understood as an instance of an access network part in the network slice, and the network slice core network subnet is understood as an instance of a core network part in the network slice. One network slice includes one or more network slice core network subnets. The network slice core network subnet is identified by using a network slice instance identifier (NSI ID) in a network.

For example, the interface of the network element is an N4 interface between an SMF and a UPF. The configuration data of the network element is a 5G quality of service identifier (QI) set preconfigured in the SMF. The 5QI set includes two preconfigured 5QIs, which are separately 5QI=1 and 5QI=5.

The network element is a network element in the network slice or the network slice subnet, or is not a network element in the network slice or the network slice subnet.

3. Identifier of a Data Source

The identifier of the data source identifies the data source. In response to the data source being a network slice, the identifier of the data source is network slice selection assistance information (for example, S-NSSAI), and identifies the network slice. In response to the data source being a network slice subnet, the identifier of the data source is a network slice subnet identifier, and identifies the network slice subnet. Specifically, in response to the data source being a network slice access network subnet, the identifier of the data source is S-NSSAI. In response to the data source being a network slice core network subnet, the identifier of the data source is S-NSSAI+NSI ID. In response to the data source being a network element, the identifier of the data source is an identifier of the network element. For example, in response to the data source being an AMF, the identifier of the data source is an AMF ID.

The network slice subnet identifier is also referred to as a network slice instance identifier. The S-NSSAI is configured for the network slice after the network slice is created in an OAM system. The NSI ID is configured for the network slice core network subnet after the network slice core network subnet is created in an OAM system. In at least one embodiment, the network slice core network subnet is also referred to as a core network slice subnet. Similarly, the network slice access network subnet is also referred to as an access network slice subnet.

4. Object Identifier that is of a Data Source and that is in an OAM System

The object identifier that is of the data source and that is in the OAM system identifies the data source in the OAM system. The data source is managed as a managed object instance (MOI) inside the OAM system. The object identifier that is of the data source and that is in the OAM system identifies, in the OAM system, an MOI that is of the data source and that is in the OAM system.

Figure 1B:
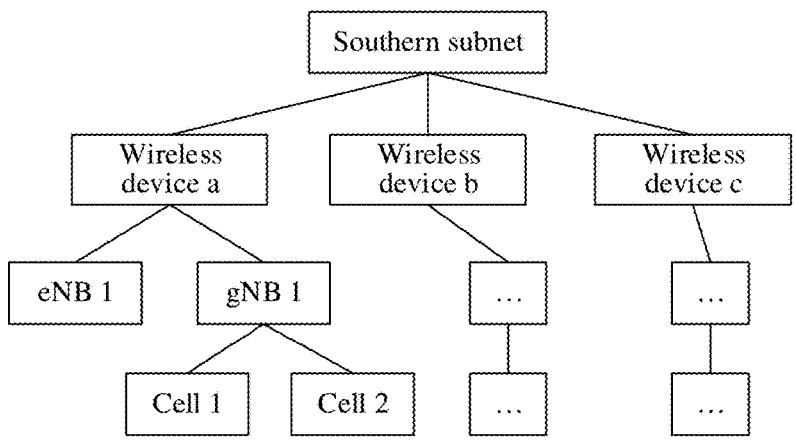
FIG. 1b is a schematic diagram of a tree structure according to at least one embodiment.

For example, a wireless network in a southern area of a city is managed as a subnet, and the wireless network is referred to as a southern subnet for short. The wireless network includes three wireless devices (a, b, and c). The wireless device a is a base station device that provides both a 4G (eNB) function and a 5G (gNB) function. An area covered by the base station device is divided into a plurality of cells. The wireless device a provides the 4G function by using an eNB 1 and provides the 5G function by using a gNB 1, and an area covered by the gNB 1 is divided into two cells (a cell 1 and a cell 2). MOIs that are of the foregoing data sources (the southern subnet, the three wireless devices, the eNB 1, the gNB 1, the cell 1, and the cell 2) in the southern subnet and that are in the OAM system forms a tree structure. A schematic diagram of the tree structure is shown in FIG. 1b. Each node in the tree structure is an MOI.

The MOI in the OAM system further has different attributes. For example, a network slice has an S-NSSAI attribute, and a core network subnet slice has an NSI ID attribute. Different access network slice subnets has different coverage. Each gNB includes one or more cells. An SMF and a UPF is configured with respective service areas. An AMF is configured with a tracking area (TA) list as a service area of the AMF.

Figure 1C:
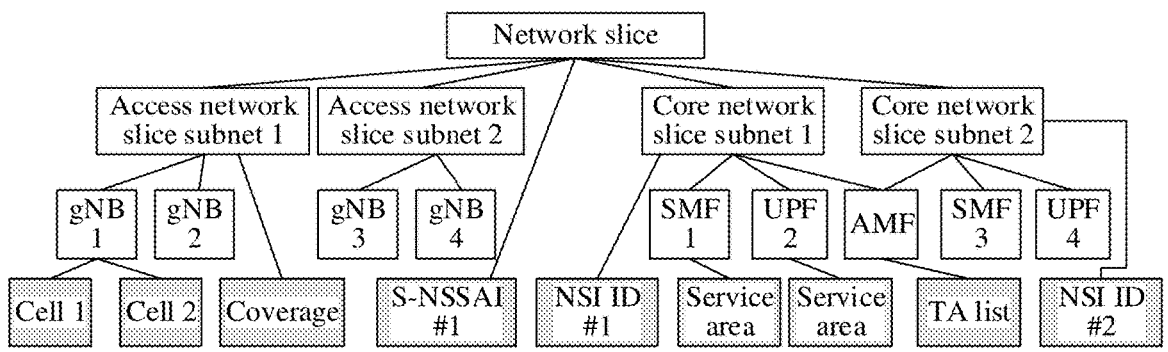
FIG. 1c is a schematic diagram of another tree structure according to at least one embodiment.

For example, a network slice includes an access network slice subnet 1 and an access network slice subnet 2. The access network slice subnet 1 includes a gNB 1 and a gNB 2, and the gNB 1 is configured with a cell 1 and a cell 2. The access network slice subnet 2 includes a gNB 3 and a gNB 4. The network slice further includes a core network slice subnet 1 and a core network slice subnet 2. The core network slice subnet 1 includes an SMF 1, a UPF 1, and an AMF. The core network slice subnet 2 includes the AMF, an SMF 2, and a UPF 2. MOIs that are of the foregoing data sources (the network slice, the access network slice subnet 1, the access network slice subnet 2, the core network slice subnet 1, and the core network slice subnet 2) in the network slice and that are in the OAM system forms a tree structure. A schematic diagram of the tree structure is shown in FIG. 1c. In FIG. 1c, a white filled box represents an MOI, and a gray filled box represents an attribute of an MOI. In at least one embodiment, after a new network slice or network slice subnet is created in the OAM system, a tree structure that is of the network slice or the network slice subnet and that is in the OAM system is created. The tree structure includes an MOI that is of the network slice or the network slice subnet and that is in the OAM system.

In at least one embodiment, the MOI is identified by using a distinguished name (DN). To be specific, the object identifier that is of the data source and that is in the OAM system is a DN of the MOI that is of the data source and that is in the OAM system. All DNs mentioned below are distinguished names.

For ease of description, in at least one embodiment, the object identifier that is of the data source and that is in the OAM system is referred to as an object identifier of the data source for short. For example, a DN of an MOI that is of a network slice and that is in the OAM system is referred to as a DN of the network slice for short, a DN of an MOI that is of a network slice subnet and that is in the OAM system is referred to as a DN of the network slice subnet for short, and a DN of an MOI that is of a network element and that is in the OAM system is referred to as a DN of the network element for short. The DN of the network slice is an object identifier generated for the network slice in response to the network slice being created in the OAM system. The DN of the network slice subnet is an object identifier generated for the network slice subnet in response to the network slice subnet being created in the OAM system.

The DN includes one or more relative distinguished names (RDNs). In an implementation, the plurality of RDNs included in the DN forms an RDN list. For example, in the RDN list, the RDNs is separated by using a comma (",").

Optionally, the DN includes two types of RDNs. A first-type RDN is located on a leftmost side of the RDN list that forms the DN, and this type of RDN is referred to as a domain component (DC). A value of the DC is a domain name. The DN including the DC is globally unique. Optionally, the DN includes one DC. A second-type RDN is an RDN except the DC in the DN. The DN includes one or more second-type RDNs. A value of the second-type RDN is related to the MOI identified by the DN.

For example, the cell 1 in FIG. 1b is used as an example. A DN of an MOI corresponding to the cell 1 is as follows:
DN="DC=operatorA.com, subNetwork=south, managedElement=a, gNBFunction=1, cell=1".

A value of a DC is a domain name operatorA.com. "subNetwork=south" indicates that the cell 1 is a cell in the southern subnet. "managedElement=a" indicates that the cell 1 is a cell obtained through division by using a base station function provided by the wireless device a. "gNBFunction=1" indicates that the cell 1 is a cell obtained through division from the area covered by the gNB 1. "cell=1" indicates that an identifier of the cell 1 is 1. In conclusion, the DN indicates that the cell 1 is a cell that is obtained through division from the area covered by the gNB 1 provided by the wireless device a in the southern subnet and whose identifier is 1.

5. OAM System

The OAM system includes one or more of the following network elements: a network function management function (NFMF), a network slice management function (NSMF), and a network slice subnet management function (NSSMF).

The NFMF is for managing a network element in the OAM system. In response to a service or an interface of the OAM system being invoked to obtain management data of a network element, specifically, in the OAM system, a service or an interface of the NFMF is invoked to obtain the management data of the network element. For example, in response to an NWDAF obtaining configuration information of an NSSF, in response to a configuration management service or interface of the OAM system being invoked to obtain the configuration information, a configuration management service or interface provided by the NFMF is specifically invoked. In response to the NWDAF obtaining overload alarm information of an SMF, in response to an alarm management service or interface of the OAM system being invoked to obtain the overload alarm information, an alarm management service or interface provided by the NFMF is specifically invoked.

The NSMF is for managing a network slice in the OAM system. In response to a service or an interface of the OAM system being invoked to obtain management data of a network slice, specifically, in the OAM system, a service or an interface of the NSMF is invoked to obtain the management data of the network slice. For example, in response to an NWDAF obtaining key performance indicator (KPI) information of a network slice, in response to a performance management service or interface of the OAM system being invoked to obtain the KPI information, a performance management service or interface provided by the NSMF is specifically invoked.

The NSSMF is for managing a network slice subnet in the OAM system. In response to a service or an interface of the OAM system being invoked to obtain management data of a network slice subnet, specifically, in the OAM system, a service or an interface of the NSSMF is invoked to obtain the management data of the network slice subnet. For example, in response to an NWDAF obtaining KPI information of a network slice subnet, in response to a performance management service or interface of the OAM system being invoked to obtain the KPI information, a performance management service or interface provided by the NSSMF is specifically invoked. The network slice is specifically created by the NSMF. Similarly, the network slice subnet is specifically created by the NSSMF.

In response to a service or an interface provided by the OAM system being invoked to obtain management data of a data source, a DN of an MOI that is of the data source and that is in the OAM system, namely, an object identifier that is of the data source and that is in the OAM system, is to be provided. For example, in response to an NWDAF obtaining configuration information of an NSSF, the NWDAF providing a DN of an MOI that is of the NSSF and that is in the OAM system, to invoke a configuration management service or interface of the OAM system to obtain the configuration information. In response to the NWDAF obtaining KPI information of a network slice or a network slice subnet, the NWDAF provides a DN of an MOI that is of the network slice or the network slice subnet and that is in the OAM system, to invoke a performance management service or interface of the OAM system to obtain the KPI information. In at least one embodiment, data that is of the data source and that is obtained from the OAM system is also referred to as the management data of the data source.

Currently, in response to an NWDAF is to obtain management data of a managed object in an OAM system, the NWDAF is to have an entire database of managed objects of the OAM system, searches, starting from a root node of an entire tree structure that is formed by the managed objects and that is similar to that shown in FIG. 1c, for the managed object corresponding to a data source in the OAM system, and obtains the data of the managed object. As a result, a process in which the NWDAF obtains the data of the managed object from the OAM system is complex.

In view of this, at least one embodiment provides a data obtaining method and system, and an apparatus thereof, to simplify the process in which the NWDAF obtains the data of the managed object from the OAM system.

Figure 1D:
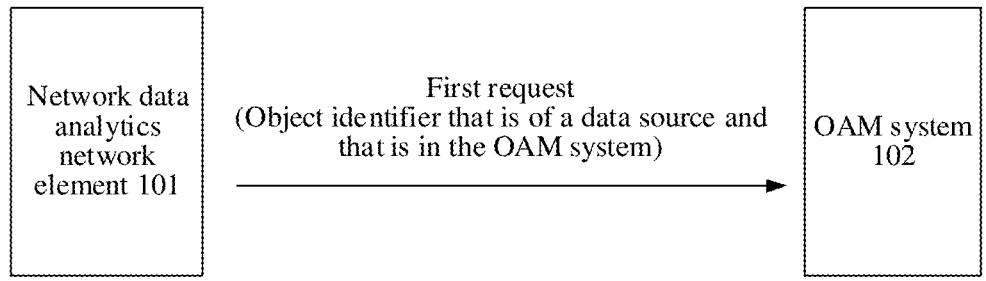
FIG. 1d is a schematic diagram of a system architecture to which at least one embodiment is applied.

FIG. 1d is a schematic diagram of a system architecture to which at least one embodiment is applied. The system architecture includes a network data analytics network element 101 and an OAM system 102. The network data analytics network element 101 is the NWDAF network element in FIG. 1a.

The network data analytics network element 101 is configured to determine a data source to which to-be-obtained data belongs; obtain first information; and determine, based on the first information, an object identifier that is of the data source and that is in an OAM system. The object identifier that is of the data source and that is in the OAM system is a DN of an MOI that is of the data source and that is in the OAM system. After determining the object identifier, the network data analytics network element 101 is further configured to send a first request to the OAM system. The first request includes the object identifier, and the first request is for requesting to obtain the to-be-obtained data.

The OAM system 102 is configured to obtain the to-be-obtained data based on the object identifier in the first request after receiving the first request from the network data analytics network element 101, and further sends the obtained to-be-obtained data to the network data analytics network element 101.

The first information includes the following information.

In a first implementation, the first information includes a correspondence between an identifier of the data source and the object identifier that is of the data source and that is in the OAM system. For specific descriptions of the correspondence, refer to descriptions in an embodiment corresponding to FIG. 3.

In a second implementation, the first information includes a generation rule of generating, based on an identifier of the data source, the object identifier that is of the data source and that is in the OAM system. For specific descriptions of the generation rule, refer to descriptions in an embodiment corresponding to FIG. 4a.

In a third implementation, the first information includes a mapping rule between a domain name of the data source and the object identifier that is of the data source and that is in the OAM system. For specific descriptions of the mapping rule, refer to descriptions in an embodiment corresponding to FIG. 5.

The network data analytics network element 101 determines, based on the first information, the object identifier that is of the data source and that is in the OAM system. In this manner, the network data analytics network element 101 does not obtain an entire database of managed objects of the OAM system, so that a process in which the network data analytics network element obtains data of a managed object from the OAM system is simplified.

From the foregoing, the first information is for associating the identifier of the data source with the object identifier that is of the data source and that is in the OAM system, or is for associating the domain name of the data source with the object identifier that is of the data source and that is in the OAM system. The first information is also referred to as association information.

The technologies described in embodiments described herein are applied to various communications systems, for example, a 4th generation (4G) communications system, a 4.5G communications system, a 5G communications system, a system integrating a plurality of communications systems, or a future evolved communications system such as a 6G communications system. A network element name, a message name, and the like mentioned in embodiments described herein are used as examples, and are applied to different communications systems. The network element name and the message name is different. This is not limited in embodiments described herein.

The communications system described in embodiments described herein is used to describe the technical solution in embodiments described herein more clearly, but does not limit the technical solution provided in embodiments described herein. A person skilled in the art learns that with evolution of a system architecture and emergence of a new service scenario, the technical solutions provided in embodiments described herein is also applicable to a similar technical problem.

The following describes in detail the data obtaining method and system, and the apparatus thereof that are provided in at least one embodiment with reference to the accompanying drawings. In descriptions of the data obtaining method, an example in which a network data analytics network element is an NWDAF network element and a network slice selection network element is an NSSF network element is used for description. For ease of description, two words "network element" are not shown in figures corresponding to embodiments, and the two words "network element" are not indicated in specific descriptions of embodiments. However, this does not affect understanding of embodiments described herein. Names of messages between network elements, names of parameters in the messages, or the like in the following embodiments described herein are merely examples, and there is other names in a specific implementation. This is not specifically limited in embodiments described herein.

Figure 2:
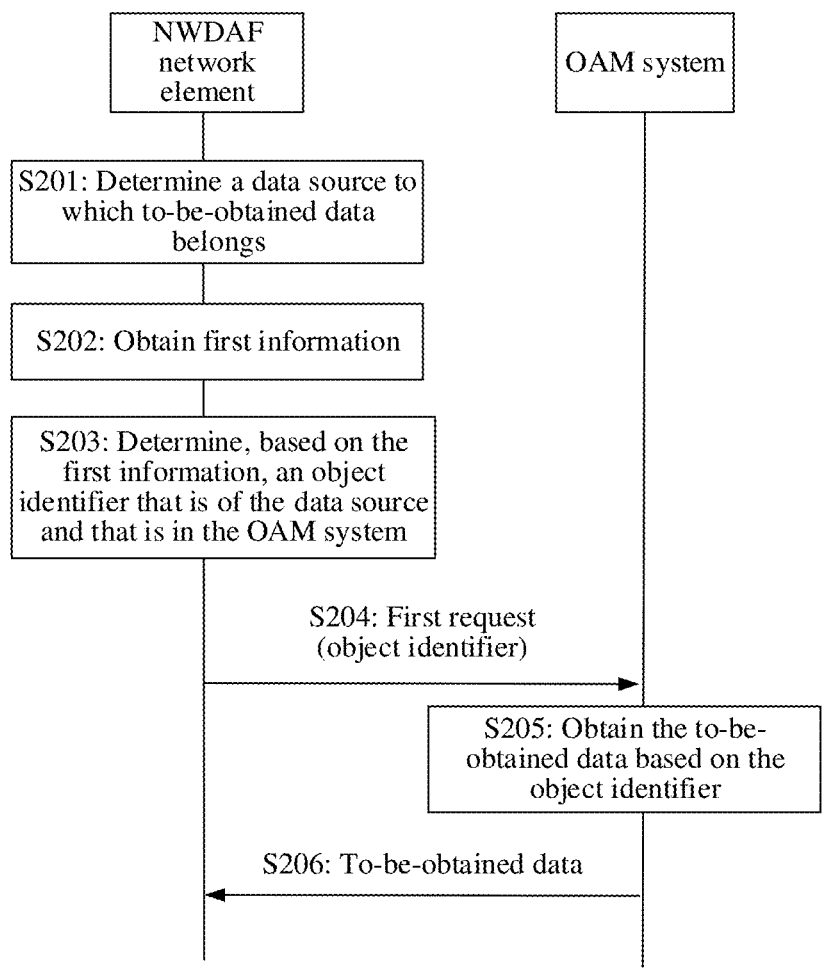
FIG. 2 is a schematic flowchart of a data obtaining method according to at least one embodiment.

FIG. 2 is a schematic flowchart of a data obtaining method according to at least one embodiment. As shown in FIG. 2, the method includes but is not limited to the following steps.

Step S201: An NWDAF network element determines a data source to which to-be-obtained data belongs.

The to-be-obtained data is configuration data of a network element, performance statistics data, a KPI of a network slice, or a KPI of a network slice subnet.

In at least one embodiment, in response to determining that the to-be-obtained data is to be obtained from an OAM system, the NWDAF network element determines the data source to which the to-be-obtained data belongs. In an implementation, the NWDAF network element receives a second request, where the second request is for requesting to perform data analytics; and determine, based on the second request, the data source to which the to-be-obtained data belongs.

In at least one embodiment, the second request includes an identifier of the data source. To be specific, a data source indicated by an identifier carried in the second request is the data source to which the to-be-obtained data belongs. Optionally, in this case, the data source includes a network slice and/or a network slice subnet. The identifier of the data source carried in the second request includes network slice selection assistance information (S-NSSAI) and/or a network slice subnet identifier (NSI ID).

In at least one embodiment, the NWDAF network element analyzes the second request, to determine the data source to which the to-be-obtained data belongs. In this manner, the second request does not carry the identifier of the data source. For example, in response to the second request being for requesting to count a quantity of quality of service (QOS) flows of a 5G quality of service identifier (5QI), and the 5QI is preconfigured by an SMF network element, the NWDAF network element analyzes the second request, and determines that the data source to which the to-be-obtained data belongs is configuration data of the SMF network element. The configuration data of the SMF network element includes a 5QI set preconfigured by the SMF network element.

A sender of the second request is a network element or a terminal device. This is not limited in at least one embodiment.

Step S202: The NWDAF network element obtains first information.

The first information is for determining an object identifier that is of the data source to which the to-be-obtained data belongs and that is in the OAM system. In at least one embodiment, the NWDAF network element obtains the first information in any one of the following manners.

Manner 1: The NWDAF network element obtains the first information from the OAM system or an NRF network element.

In Manner 1, the OAM system or the NRF network element actively sends the first information to the NWDAF network element. Alternatively, the NWDAF network element sends a request 1 to the OAM system or the NRF network element, to request to obtain the first information. After receiving the request 1, the OAM system or the NRF network element sends the first information to the NWDAF network element.

The NRF network element obtains the first information from the OAM system or an NSSF network element, and then send the first information to the NWDAF network element. The NSSF network element obtains the first information from the OAM system, and then send the first information to the NRF network element. In other words, in Manner 1, the first information is actually from the OAM system. The OAM system generates the first information, and send the first information to a first network element. The first network element is the NWDAF network element, the NSSF network element, or the NRF network element. To be specific, the OAM system directly sends the first information to the NWDAF network element, or send the first information to the NWDAF network element via one or more network elements (namely, the NRF network element, or the NSSF network element and the NRF network element). Optionally, the OAM system sends a configuration command to the first network element, where the configuration command includes the first information.

Manner 2: The NWDAF network element obtains a network function profile (NF profile) from the OAM system or an NRF network element, where the network function profile includes the first information.

In Manner 2, the OAM system or the NRF network element actively sends the network function profile to the NWDAF network element. Alternatively, the NWDAF network element sends a request 2 to the OAM system or the NRF network element, to request to obtain the network function profile. After receiving the request 2, the OAM system or the NRF network element sends the network function profile to the NWDAF network element.

The NRF network element obtains the network function profile from the OAM system or an NSSF network element, and then send the network function profile to the NWDAF network element. The NSSF network element obtains the network function profile from the OAM system, and then send the network function profile to the NRF network element. In other words, in Manner 2, the network function profile is actually from the OAM system. The OAM system generates the network function profile, and send the network function profile to a first network element. The first network element is the NWDAF network element, the NSSF network element, or the NRF network element. To be specific, the OAM system directly sends the network function profile to the NWDAF network element, or send the network function profile to the NWDAF network element via one or more network elements (namely, the NRF network element, or the NSSF network element and the NRF network element). The network function profile is a configuration file of the NWDAF network element or a configuration file of the NSSF network element.

Manner 3: The NWDAF network element obtains the first information from a memory of the NWDAF network element. In other words, the NWDAF network element locally obtains the first information. Optionally, the first information is built in the NWDAF network element, or is preconfigured in the NWDAF network element.

Step S203: The NWDAF network element determines, based on the first information, the object identifier that is of the data source and that is in the OAM system.

After obtaining the first information, the NWDAF network element determines, based on the first information, the object identifier that is of the data source and that is in the OAM system. For example, in response to the first information including a correspondence between an identifier of the data source and the object identifier that is of the data source and that is in the OAM system, the NWDAF network element determines the object identifier that is of the data source and that is in the OAM system based on the identifier of the data source and the correspondence.

Step S204: The NWDAF network element sends a first request to the OAM system, where the first request includes the object identifier, and the first request is for requesting to obtain the to-be-obtained data. The OAM system receives the first request.

After determining the object identifier that is of the data source and that is in the OAM system, the NWDAF network element sends the first request to the OAM system, to request to obtain the to-be-obtained data. For example, the NWDAF network element uses the object identifier as a parameter to invoke a createMeasurementJob or subscribe service interface of the OAM system, so as to obtain performance statistics data or alarm information data of the data source. For another example, the NWDAF network element uses the object identifier as a parameter to invoke a getMOIAttribute service interface of the OAM system, so as to obtain a specific value of a configuration item that is of the data source and that is in the OAM system.

Step S205: The OAM system obtains the to-be-obtained data based on the object identifier.

After receiving the first request, the OAM system obtains the to-be-obtained data based on the object identifier in the first request.

The OAM system includes a management device. In at least one embodiment, steps performed by the OAM system is specifically performed by the management device. In response to the data source being a network element, an interface of the network element, or configuration data of the network element, the management device is the foregoing NFMF. In this case, the NWDAF network element invokes the getMOIAttribute service interface of the NFMF by using the object identifier as a parameter. Similarly, in response to the data source being a network slice, the management device is the foregoing NSMF. In this case, the NWDAF network element invokes the createMeasurementJob or subscribe service interface of the NSMF by using the object identifier as a parameter. In response to the data source is a network slice subnet, the management device is the foregoing NSSMF. In this case, the NWDAF network element invokes the createMeasurementJob or subscribe service interface of the NSSMF by using the object identifier as a parameter.

Step S206: The OAM system sends the to-be-obtained data to the NWDAF network element.

After obtaining the to-be-obtained data, the OAM system sends the to-be-obtained data to the NWDAF network element. Correspondingly, after receiving the to-be-obtained data, the NWDAF network element performs data analytics based on the to-be-obtained data, to obtain an analytics result. Optionally, the NWDAF network element sends the analytics result to the sender of the second request.

Specifically, in response to the data source to which the to-be-obtained data belongs being a network slice, an NSMF in the OAM system obtains the to-be-obtained data, and send the to-be-obtained data to the NWDAF network element. In response to the data source to which the to-be-obtained data belongs being a network slice subnet, an NSSMF in the OAM system obtains the to-be-obtained data, and send the to-be-obtained data to the NWDAF network element. In response to the data source to which the to-be-obtained data belongs being a network element (or an interface of the network element or configuration data of the network element), an NFMF in the OAM system obtains the to-be-obtained data, and send the to-be-obtained data to the NWDAF network element.

In at least one embodiment, the NWDAF network element determines, based on the first information, the object identifier that is of the data source and that is in the OAM system. In this manner, the NWDAF network element does not obtain an entire database of managed objects of the OAM system, so that a process in which the NWDAF network element obtains data from the OAM system is simplified. In addition, the NWDAF network element does not obtain the entire database of managed objects of the OAM system, so that the NWDAF network element does not have a right of viewing all network management data. This helps ensure network element security.

Figure 3:
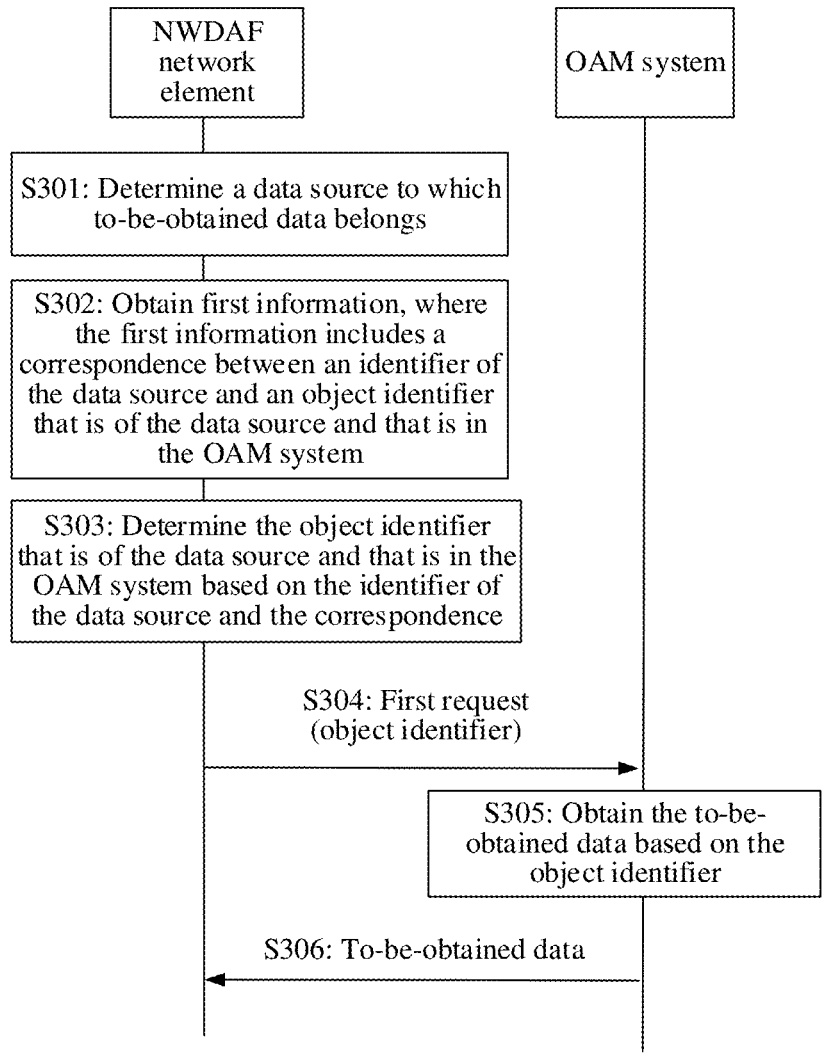
FIG. 3 is a schematic flowchart of another data obtaining method according to at least one embodiment.

FIG. 3 is a schematic flowchart of another data obtaining method according to at least one embodiment. In this embodiment, a data source is a network slice or a network slice subnet. In the method, how an NWDAF network element determines an object identifier that is of the data source and that is in an OAM system based on a correspondence between an identifier of the data source and the object identifier that is of the data source and that is in the OAM system is described in detail. The method includes but is not limited to the following steps.

Step S301: An NWDAF network element determines a data source to which to-be-obtained data belongs.

For an execution process of step S301, refer to specific descriptions of step S201 in FIG. 2. Details are not described herein again.

Step S302: The NWDAF network element obtains first information, where the first information includes a correspondence between an identifier of the data source and an object identifier that is of the data source and that is in an OAM system.

For a manner in which the NWDAF network element obtains the first information, refer to specific descriptions of step S202 in FIG. 2. Details are not described herein again.

The identifier of the data source in the first information identifies a network slice or a network slice subnet. The identifier of the data source includes network slice selection assistance information and/or a network slice subnet identifier. The object identifier that is of the data source and that is in the OAM system includes a managed object identifier relating to network slice managed object identifier and/or a managed object identifier relating to network slice subnet. For example, the identifier of the data source in the first information identifies a network slice, an identifier of the network slice is S-NSSAI, and the object identifier is a DN. The correspondence is shown in Table 1.

TABLE 1

| | Correspondence |
|---|---|
| Identifier of the data source | Object identifier that is of the data source and that is in the OAM system |
| S-NSSAI 1 | DN 1 |
| S-NSSAI 2 | DN 2 |

From Table 1, after obtaining the identifier of the data source to which the to-be-obtained data belongs, the NWDAF network element determines the object identifier that is of the data source and that is in the OAM system by querying Table 1. Optionally, the NWDAF network element obtains the identifier of the data source from the second request. For details, refer to the descriptions of step S201 in FIG. 2. Details are not described herein again.

Refer to the descriptions of step S202 in FIG. 2. The first information is actually from the OAM system. In response to the NWDAF network element not being expected, based on a permission control and security requirement of network management, to obtain data of a network slice or a network slice subnet, after the network slice or the network slice subnet is created in the OAM system, a correspondence between an identifier of the network slice and an object identifier that is of the network slice and that is in the OAM system is not configured, or a correspondence between an identifier of the network slice subnet and an object identifier that is of the network slice subnet and that is in the OAM system is not configured in the OAM system. In this way, the NWDAF network element cannot obtain the object identifier of the network slice or the network slice subnet from the first information, and cannot further obtain DNs of a slice subnet and each network element that are included in the network slice (or cannot obtain a DN of each network element included in the newly created network slice subnet). Therefore, the NWDAF network element cannot invoke a management service interface provided by the OAM system to obtain data of the network slice or the network slice subnet, so that an objective of network security and permission control is achieved.

In an implementation, the first information is included in a network function profile. The network function profile includes but is not limited to one or more of the following: a correspondence (for example, referred to as a correspondence 1) between an identifier of the network slice and an object identifier that is of the network slice and that is in the OAM system; a correspondence (for example, referred to as a correspondence 2) between an identifier of the network slice and an object identifier that is of the network slice subnet in the network slice and that is in the OAM system; a correspondence (for example, referred to as a correspondence 3) between an identifier of the network slice subnet in the network slice and an object identifier that is of the network slice and that is in the OAM system; or a correspondence (for example, referred to as a correspondence 4) between an identifier of the network slice subnet in the network slice and an object identifier that is of the network slice subnet and that is in the OAM system. Optionally, the correspondence 3 is specifically a correspondence between an identifier of a core network slice subnet in the network slice and the object identifier that is of the network slice and that is in the OAM system. The correspondence 4 is specifically a correspondence between an identifier of a core network slice subnet in the network slice and an object identifier that is of the core network slice subnet and that is in the OAM system.

For example, in response to the network function profile including the correspondence 1, a specific form of the correspondence included in the network function profile is: S-NSSAI: {DN of the network slice}.

In the correspondence 2, an identifier of a network slice corresponds to an object identifier that is of one or more network slice subnets (for example, an access network slice subnet and/or a core network slice subnet) in the network slice and that is in the OAM system. To be specific, after obtaining the correspondence 2 and the identifier of the network slice, the NWDAF network element learns of the object identifier that is of the network slice subnet in the network slice and that is in the OAM system. For example, the identifier of the network slice is S-NSSAI, and the object identifier is a DN. One piece of S-NSSAI corresponds to a DN that is of one or more network slice subnets and that is in the OAM system.

For example, in response to the network function profile including the correspondence 1 and the correspondence 2, the specific form of the correspondence included in the network function profile is: S-NSSAI: {DN of the network slice, DN of one or more AN slice subnets, DN of one or more CN slice subnets}. In response to the specific form being applied to the tree structure shown in FIG. 1c, the correspondence included in the network function profile is: S-NSSAI #1: {DN of the network slice, DN of the AN slice subnet 1 and DN of the AN slice subnet 2, DN of the CN slice subnet 1 and DN of the CN slice subnet 2}, or S-NSSAI #1: {DN of the network slice, DN list of AN slice subnets: {DN of the AN slice subnet 1, DN of the AN slice subnet 2}, DN list of CN slice subnets: {DN of the CN slice subnet 1, DN of the CN slice subnet 2}}.

For example, in response to the network function profile including the correspondence 3, and the identifier of the network slice subnet being S-NSSAI+NSI ID, the specific form of the correspondence included in the network function profile is: S-NSSAI+NSI ID: {DN of the network slice}.

For example, in response to the network function profile including the correspondence 4, and the correspondence 4 being specifically the correspondence between the identifier of the core network slice subnet in the network slice and the object identifier that is of the core network slice subnet and that is in the OAM system, the specific form of the correspondence included in the network function profile is: S-NSSAI+NSI ID: {DN of the CN slice subnet}. In response to the specific form being applied to the tree structure shown in FIG. 1c, the correspondence included in the network function profile is: {S-NSSAI #1+NSI ID #1: DN of the CN slice subnet 1; S-NSSAI #1+NSI ID #2: DN of the CN slice subnet 2}.

For example, in response to the network function profile including the correspondence 1, the correspondence 2, and the correspondence 4, and the correspondence 4 is specifically the correspondence between the identifier of the core network slice subnet in the network slice and the object identifier that is of the core network slice subnet and that is in the OAM system, the specific form of the correspondence included in the network function profile is: S-NSSAI: {DN of the network slice, {NSI ID: DN of the CN slice subnet}}. In response to the specific form being applied to the tree structure shown in FIG. 1c, the correspondence included in the network function profile is: S-NSSAI #1: {DN of the network slice, DN list (optional) of AN slice subnets, DN list of CN slice subnets: {NSI ID #1: DN of the CN slice subnet 1; NSI ID #2: DN of the CN slice subnet 2}}.

In response to the network function profile including one or more of the correspondence 1, the correspondence 2, the correspondence 3, and the correspondence 4, the NWDAF network element selects a correspondence from the correspondences based on a determined data source, and then perform a subsequent step.

Step S303: The NWDAF network element determines the object identifier that is of the data source and that is in the OAM system based on the identifier of the data source and the correspondence.

After obtaining the identifier of the data source to which the to-be-obtained data belongs, the NWDAF network element determines the object identifier that is of the data source and that is in the OAM system by querying Table 1.

It is learned from the foregoing that, the network function profile includes one or more of the correspondence 1, the correspondence 2, the correspondence 3, and the correspondence 4. In response to the data source to which the to-be-obtained data belongs being the network slice subnet, the NWDAF network element determines the object identifier that is of the data source and that is in the OAM system based on the identifier of the data source and the correspondence 4 in the network function profile.

Step S304: The NWDAF network element sends a first request to the OAM system, where the first request includes the object identifier, and the first request is for requesting to obtain the to-be-obtained data.

Step S305: The OAM system obtains the to-be-obtained data based on the object identifier.

Step S306: The OAM system sends the to-be-obtained data to the NWDAF network element.

For an execution process of step S304 to step S306, refer to specific descriptions of step S204 to step S206 in FIG. 2. Details are not described herein again.

In at least one embodiment, the NWDAF network element determines the object identifier that is of the data source and that is in the OAM system based on the correspondence between the identifier of the data source and the object identifier that is of the data source and that is in the OAM system. In this manner, the NWDAF network element does not obtain an entire database of managed objects of the OAM system, so that a process in which the NWDAF network element obtains data from the OAM system is simplified. In addition, the NWDAF network element does not obtain the entire database of managed objects of the OAM system, so that the NWDAF network element does not have a right of viewing all network management data. This helps ensure network element security.

Figure 4A:
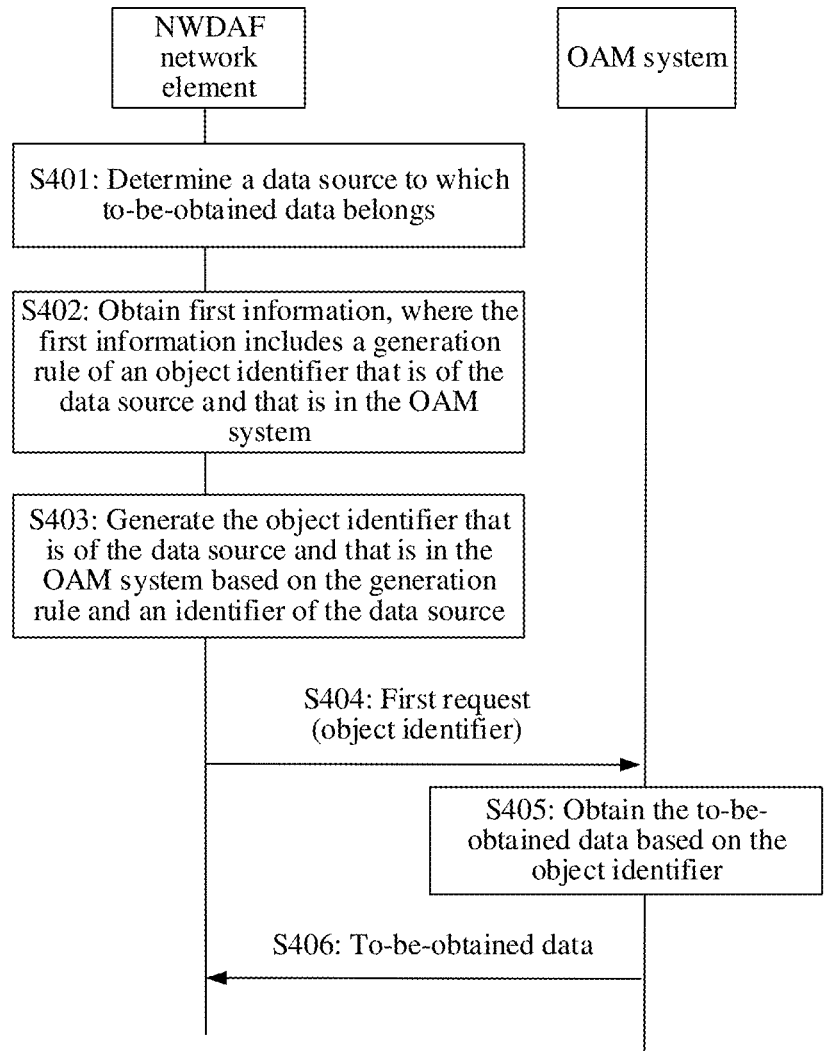
FIG. 4a is a schematic flowchart of still another data obtaining method according to at least one embodiment.

FIG. 4a is a schematic flowchart of still another data obtaining method according to at least one embodiment. In at least one embodiment, a data source is a network slice or a network slice subnet. In the method, how an NWDAF network element generates an object identifier that is of the data source and that is in an OAM system based on an identifier of the data source and a generation rule of the object identifier that is of the data source and that is in the OAM system is described in detail. The method includes but is not limited to the following steps.

Step S401: An NWDAF network element determines a data source to which to-be-obtained data belongs.

For an execution process of step S401, refer to specific descriptions of step S201 in FIG. 2. Details are not described herein again.

Step S402: The NWDAF network element obtains first information, where the first information includes a generation rule of an object identifier that is of the data source and that is in an OAM system.

For a manner in which the NWDAF network element obtains the first information, refer to specific descriptions of step S202 in FIG. 2. Details are not described herein again.

The first information specifically includes a generation rule of generating, based on an identifier of the data source, the object identifier that is of the data source and that is in the OAM system. The NWDAF network element obtains the identifier of the data source from the second request. For details, refer to the descriptions of step S201 in FIG. 2. Details are not described herein again.

For example, the object identifier is a DN, the DN includes one or more RDNs, the RDN includes an RDN name and a value of the RDN name, and the identifier of the data source includes a value of the identifier of the data source. The generation rule included in the first information is: using the value of the identifier of the data source as the value of the RDN name. Specifically, in response to the data source being a network slice, the generation rule is using a value of an identifier (namely, a value of S-NSSAI) of the network slice as the value of the RDN name. For example, S-NSSAI xxx indicates that the value of the identifier (the S-NSSAI) of the network slice is "xxx", and an RDN name in a DN of the network slice includes "networkslice". In this case, an RDN generated based on the generation rule is "networkslice=xxx".

In response to the data source being a core network slice subnet, the generation rule is using a value of an identifier (namely, a value of S-NSSAI and a value of an NSI ID) of the core network slice subnet as the value of the RDN name. Specifically, the generation rule is using the value of the S-NSSAI of the core network slice subnet as a value of an RDN name, and using the value of the NSI ID of the core network slice subnet as a value of another RDN name. For example, S-NSSAI xxx and NSI ID yy indicate that the value of the S-NSSAI of the core network slice subnet is xxx, and the value of the NSI ID of the core network slice subnet is yy. An RDN name in a DN of the core network slice subnet includes "networkslice" and "networkslicesubnet". In this case, one RDN generated based on the generation rule is "networkslice=xxx", and the other RDN is "networkslicesubnet=y" or "networkslicesubnet=CN-yy".

In response to the data source being an access network slice subnet, the generation rule is using a value of an identifier (namely, a value of S-NSSAI) of a network slice to which the access network slice subnet belongs as the value of the RDN name. Specifically, the generation rule is using the value of the S-NSSAI of the access network slice subnet as a value of an RDN name, and using the value of the S-NSSAI of the access network slice subnet as a value of another RDN name. For example, S-NSSAI xxx indicates that the value of the S-NSSAI of the access network slice subnet is xxx, and a value of an identifier of the access network slice subnet is also xxx. An RDN name in a DN of the access network slice subnet includes "networkslice" and "networkslicesubnet". In this case, one RDN generated based on the generation rule is "networkslice=xxx", and the other RDN is "networkslicesubnet=xxx", "networkslicesubnet=RAN-xxx", or "networkslicesubnet=AN-xxx".

In the foregoing descriptions, an uppercase letter represents the identifier of the network slice, and a lowercase letter represents the RDN name, to facilitate distinguishing between the identifier of the network slice and the RDN name. The uppercase letter and the lowercase letter are merely used as an example. During specific implementation, the identifier of the network slice and the RDN name is the same.

Step S403: The NWDAF network element generates the object identifier that is of the data source and that is in the OAM system based on the generation rule and the identifier of the data source.

Specifically, after obtaining the generation rule and the identifier of the data source, the NWDAF network element generates the object identifier that is of the data source and that is in the OAM system based on the generation rule and the identifier of the data source.

In an implementation, the object identifier that is of the data source and that is in the OAM system includes a first identifier and a second identifier, and the generation rule includes a first generation rule and a second generation rule. The first generation rule includes a rule of generating the first identifier based on a domain name of the NWDAF network element. The second generation rule includes a rule of generating the second identifier based on the identifier of the data source. The NWDAF network element generates the first identifier based on the first generation rule and the domain name of the NWDAF network element, and generate the second identifier based on the second generation rule and the identifier of the data source.

The object identifier that is of the data source and that is in the OAM system includes a DC and an RDN set, and the RDN set includes one or more RDNs. The first identifier includes the DC and first one or more neighboring RDNs in the RDN set, and the second identifier includes last one or more RDNs in the RDN set. The first identifier and the second identifier form the DC and the RDN set. In other words, a position of the first identifier in the DN is before a position of the second identifier in the DN. For content of the second generation rule, refer to specific descriptions of step S402. Details are not described herein again.

First generation rule: Generate the first identifier based on first n levels of domain names of the NWDAF network element. n is an integer greater than or equal to 2. Specifically, the first generation rule is: using first two levels of domain names of the NWDAF network element as the DC, and respectively using each level of domain name from the $3^{rd}$ level of domain name to first n levels of domain name of the NWDAF network element as a value of each RDN name in the first identifier. A value of n is determined by the OAM system, or is agreed on in a protocol. This is not limited in at least one embodiment.

For example, in response to the domain name of the NWDAF network element being "nwdaf.5gc.mnc001.mcc460.3gppnetwork.org", and n=4, first two levels of domain names "3gppnetwork.org" of the NWDAF network element are used as the DC, to obtain "DC=3gppnetwork.org", and each level of domain name from the $3^{rd}$ level of domain name (namely, "mcc460") of the NWDAF network element to first four levels of domain names (namely, "mnc001") of the NWDAF network element is respectively used as the value of each RDN name in the first identifier, to obtain "MCC=460, MNC=001". Therefore, the first identifier generated according to the first generation rule is "DC=3gppnetwork.org, MCC=460, MNC=001".

For example, after the network slice and the network slice subnet are created in the OAM system, in response to S-NSSAI 567 and an NSI ID abc being configured for the NWDAF network element in the OAM system, the NWDAF network element generates the following according to the second generation rule and the first generation rule in the foregoing example:

DN of the network slice: "DC=3gppnetwork.org, MCC=460, MNC-001, networkslice=567".

DN of the access network slice subnet: "DC=3gppnetwork.org, MCC=460, MNC=001, networkslice=567, networkslicesubnet=RAN-567".

DN of the core network slice subnet: "DC=3gppnetwork.org, MCC=460, MNC=001, networkslice=567, networkslicesubnet=CN-abc".

Optionally, the first identifier includes a first identifier 1 and a first identifier 2. The first generation rule includes a first generation rule 1 and a first generation rule 2. The first generation rule 1 includes a rule of generating the first identifier 1 based on the domain name of the NWDAF network element. For details, refer to the foregoing descriptions about the first generation rule and the first identifier. The first generation rule 2 includes a rule of generating the first identifier 2 based on a host name of the NWDAF network element. It is understood that the NWDAF network element generates the first identifier 1 based on the first generation rule 1 and the domain name of the NWDAF network element; generate the first identifier 2 based on the first generation rule 2 and the host name of the NWDAF network element; and generate the second identifier based on the second generation rule and the identifier of the data source.

Figure 4B:
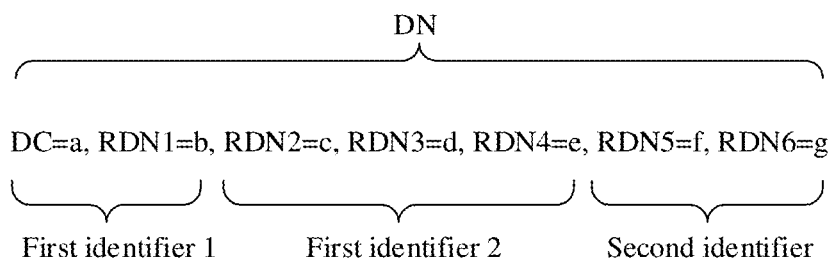
FIG. 4b is a schematic diagram of compositions of an object identifier that is of a data source and that is in an OAM system according to at least one embodiment.

The first identifier 1 includes the DC and first one or more neighboring RDNs in the RDN set. The first identifier 2 includes one or more RDNs that are in the RDN set and that are adjacent to the RDN in the first identifier 1. The second identifier is one or more RDNs that are in the RDN set and that are adjacent to the first identifier 2. For a schematic diagram of compositions of the object identifier that is of the data source and that is in the OAM system, refer to FIG. 4b. In FIG. 4b, an example in which the first identifier 1 includes one RDN, the first identifier 2 includes three RDNs, and the second identifier includes two RDNs is used.

The host name includes one or more segments of characters that are separated by using ".". Optionally, the first generation rule 2 is: using a letter part in each segment of character strings separated by using "." in the host name of the NWDAF network element as the RDN name, and using a numeric part in each segment of character strings as the value of the RDN name.

For example, in response to the host name of the NWDAF network element being "nwdaf1. managedElement1", the first identifier 2 generated based on the host name is "managedElement=1, NWDAFID=1". managedElement is a physical device configured to manage the NWDAF network element. In another implementation, managedElement does not exist. Optionally, whether the physical device managedElement configured to manage the NWDAF network element exist depends on deployment of an operator. The host name including a specific network element (for example, the NWDAF network element) is used as an example. In another feasible implementation, the host name alternatively includes an interface or configuration data of a network element.

The domain name of the NWDAF network element is a fully qualified domain name (FQDN). The FQDN is a name that includes both a host name and a domain name, where the host name and the domain name are connected by using punctuation ".". For example, in response to the host name is bigserver and the domain name is mycompany.com, the FQDN is bigserver.mycompany.com.

Step S404: The NWDAF network element sends a first request to the OAM system, where the first request includes the object identifier, and the first request is for requesting to obtain the to-be-obtained data.

Step S405: The OAM system obtains the to-be-obtained data based on the object identifier.

Step S406: The OAM system sends the to-be-obtained data to the NWDAF network element.

For an execution process of step S504 to step S506, refer to specific descriptions of step S204 to step S206 in FIG. 2. Details are not described herein again.

In at least one embodiment, the NWDAF network element generates the object identifier that is of the data source and that is in the OAM system based on the identifier of the data source and the generation rule of the object identifier that is of the data source and that is in the OAM system. In this manner, the NWDAF network element does not obtain an entire database of managed objects of the OAM system, so that a process in which the NWDAF network element obtains data from the OAM system is simplified. In addition, the NWDAF network element does not obtain the entire database of managed objects of the OAM system, so that the NWDAF network element does not have a right of viewing all network management data. This helps ensure network element security. In addition, in response to the data source being a network slice or a network slice subnet, even in response to a network slice or a network slice subnet being newly added, an object identifier that is of the (newly added) network slice or network slice subnet and that is in the OAM system is generated according to the historically obtained generation rule.

Figure 5:
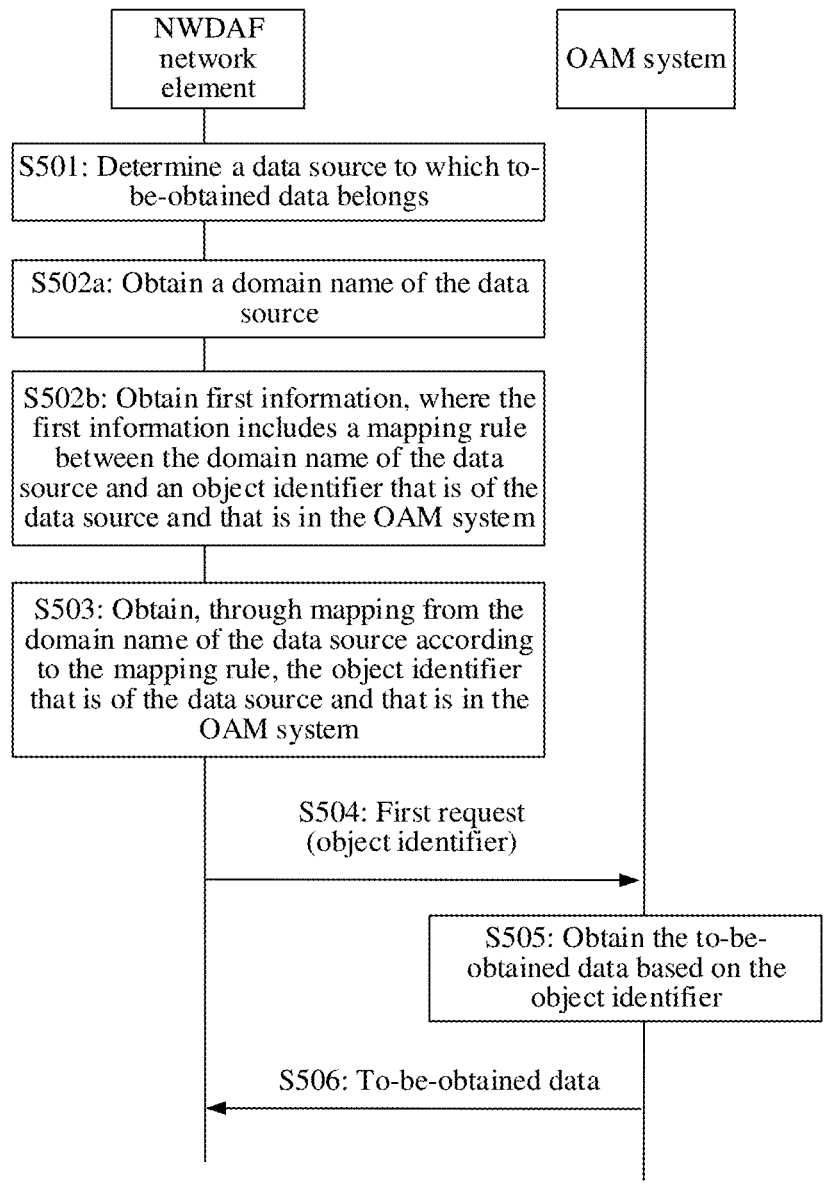
FIG. 5 is a schematic flowchart of still another data obtaining method according to at least one embodiment.

FIG. 5 is a schematic flowchart of still another data obtaining method according to at least one embodiment. In this embodiment, a data source is a network element, an interface of the network element, or configuration data of the network element. In the method, how an NWDAF network element obtains, through mapping according to a mapping rule between a domain name of the data source and an object that is of the data source and that is in an OAM system, the object identifier that is of the data source and that is in the OAM system is described in detail. The method includes but is not limited to the following steps.

Step S501: An NWDAF network element determines a data source to which to-be-obtained data belongs.

For an execution process of step S501, refer to specific descriptions of step S201 in FIG. 2. Details are not described herein again.

Step S502a: The NWDAF network element obtains a domain name of the data source.

In an implementation, the NWDAF network element obtains the domain name of the data source in the following manner:

The NWDAF network element sends a third request to an NRF network element, where the third request is for requesting to obtain the domain name of the data source; and the NWDAF network element receives the domain name of the data source from the NRF network element. Alternatively, in response to the data source being the NWDAF network element, the NWDAF network element obtains the domain name of the NWDAF network element from a memory of the NWDAF network element.

In response to the NWDAF network element is not expected, based on a permission control and security requirement of network management, to obtain data of a network element, in response to the network element being configured in the OAM system, only an IP address but not a domain name is provided. In this way, information registered by the network element with the NRF network element does not include the domain name of the network element, and the NWDAF network element cannot obtain the domain name of the network element from the NRF network element. Further, the NWDAF network element cannot obtain an object identifier that is of the network element and that is in the OAM system. The NWDAF network element cannot invoke a management service interface provided by the OAM system to obtain the data of the network element, so that an objective of network security and permission control is achieved.

Step S502b: The NWDAF network element obtains first information, where the first information includes a mapping rule between the domain name of the data source and an object identifier that is of the data source and that is in an OAM system.

For a manner in which the NWDAF network element obtains the first information, refer to specific descriptions of step S202 in FIG. 2. Details are not described herein again.

The mapping rule is: mapping first m levels of domain names of the data source to the object identifier that is of the data source and that is in the OAM system. The object identifier that is of the data source and that is in the OAM system includes a DC and an RDN set, and the RDN set includes one or more RDNs. Specifically, the mapping rule is: obtaining the DC from first two levels of domain names of the data source through mapping, and respectively obtaining a value of each RDN name in the object identifier that is of the data source and that is in the OAM system through mapping from each level of domain name from the $3^{rd}$ level of domain name to first m levels of domain names of the data source. A value of m is determined by the OAM system, or is agreed on in a protocol. This is not limited in at least one embodiment.

For example, in response to the data source being an SMF network element, a domain name of the SMF network element is "smf.5gc.mnc001.mcc460.3gppnetwork.org", and m=4, "DC=3gppnetwork.org" is obtained through mapping from first two levels of domain names "3 gppnetwork.org" of the SMF network element; "MCC=460" is obtained through mapping from the $3^{rd}$ level of domain name (namely, "mcc460") of the SMF network element; and "MNC-001" is obtained through mapping from the 4th level of domain name (namely, "mnc001") of the SMF network element. Therefore, the object identifier obtained through mapping according to the mapping rule is "DC=3gppnetwork.org, MCC=460, MNC=001".

Alternatively, the mapping rule is specifically: mapping a domain name "south.subNetwork.operatorA.com" to DC=operatorA.com, subNetwork=south. subNetwork is an RDN name.

An execution sequence of step S502a and step S502b is not limited in at least one embodiment. Step S502a or step S502b is performed first, or step S502a and step S502b is performed simultaneously.

Step S503: The NWDAF network element obtains, through mapping from the domain name of the data source according to the mapping rule, the object identifier that is of the data source and that is in the OAM system.

In an implementation, the object identifier that is of the data source and that is in the OAM system includes a third identifier and a fourth identifier. The first information includes a first mapping rule between the domain name of the data source and the third identifier and a second mapping rule between a host name of the data source and the fourth identifier. For details of the first mapping rule, refer to the foregoing descriptions about the mapping rule. The NWDAF network element obtains the host name of the data source; obtain the third identifier through mapping from the domain name of the data source according to the first mapping rule; and obtain the fourth identifier through mapping from the host name of the data source according to the second mapping rule.

The object identifier that is of the data source and that is in the OAM system includes a DC and an RDN set, and the RDN set includes one or more RDNs. The third identifier includes the DC and first one or more neighboring RDNs in the RDN set, and the fourth identifier includes last one or more RDNs in the RDN set. The third identifier and the fourth identifier form the DC and the RDN set. In other words, a position of the third identifier in the DN is before a position of the fourth identifier in the DN.

The host name includes one or more segments of characters that are separated by using ".". Optionally, the first generation rule 2 is: using a letter part in each segment of character strings separated by using "." in the host name of the data source as the RDN name, and using a numeric part in each segment of character strings as the value of the RDN name. The domain name of the data source is a fully qualified domain name (FQDN). The FQDN includes both a host name and a domain name.

For example, in response to the data source being an SMF network element, an FQDN of the SMF network element is "smf1.managedElement1.south.subNetwork.operatorA.com", and m=4. a third identifier that is of the SMF network element, that is in the OAM system, and that is obtained through mapping according to the first mapping rule is "DC=operatorA.com, subNetwork=south". A fourth identifier that is of the SMF network element, that is in the OAM system, and that is obtained through mapping according to the second mapping rule is "managedElement=1, SMF=1". managedElement is a physical device configured to manage the SMF network element. In another implementation, managedElement does not exist. Optionally, whether the physical device managedElement configured to manage the SMF network element exist depends on deployment of an operator. The host name includes a specific network element (for example, the SMF network element) is used as an example. In another feasible implementation, the host name alternatively includes an interface or configuration data of a network element. For example, the host name includes an N4 interface 1 (N4Inf1.smf1.managedElement1) between an SMF 1 and a UPF. Alternatively, the host name includes a 5QI set 1 (5QIset1.smf1.managedElement1) preconfigured on an SMF 1. The 5QI set 1 includes two preconfigured 5QIs, where one 5QI=1, and the other 5QI=5.

Step S504: The NWDAF network element sends a first request to the OAM system, where the first request includes the object identifier, and the first request is for requesting to obtain the to-be-obtained data.

Step S505: The OAM system obtains the to-be-obtained data based on the object identifier.

Step S506: The OAM system sends the to-be-obtained data to the NWDAF network element.

For an execution process of step S504 to step S506, refer to specific descriptions of step S204 to step S206 in FIG. 2. Details are not described herein again.

In an implementation, in response to the to-be-obtained data being a 5QI set configured by an SMF network element, after obtaining the 5QI set, the NWDAF network element further obtains, from the OAM system, a performance statistics indicator corresponding to the 5QI, for example, a quantity of QoS flows of each 5QI.

The NWDAF network element obtains, from the OAM system, configuration data of each NF including an access network element, for example, information such as a cell list configured by a gNB, a service area configured by an SMF, an S-NSSAI list and an NSI ID list configured by an NSSF, or a capacity and a deployment location of a UPF. The NWDAF network element uses the data obtained from the OAM system as input data for data analytics.

In response to the NWDAF network element obtaining a DN of an MOI that is of the data source and that is in the OAM system, the NWDAF network element obtains DNs of all sub-MOIs that use the MOI as a vertex and that are in a tree structure to which the MOI belongs in the OAM system. For example, in FIG. 1b, in response to the NWDAF network element obtaining a DN that is of the wireless device a (one MOI) and that is in the OAM system, the NWDAF network element obtains DNs that are of MOIs such as the wireless device a, the eNB 1, the gNB 1, the cell 1, and the cell 2 and that are in the OAM system.

In at least one embodiment, the NWDAF network element obtains, through mapping from the domain name of the data source according to the mapping rule between the domain name of the data source and the object identifier that is of the data source and that is in the OAM system, the object identifier that is of the data source and that is in the OAM system. In this manner, the NWDAF network element does not obtain an entire database of managed objects of the OAM system, so that a process in which the NWDAF network element obtains data from the OAM system is simplified. In addition, the NWDAF network element does not obtain the entire database of managed objects of the OAM system, so that the NWDAF network element does not have a right of viewing all network management data. This helps ensure network element security.

Corresponding to the methods provided in the foregoing method embodiments, at least one embodiment further provides a corresponding apparatus. The apparatus includes a corresponding module configured to perform the foregoing embodiments. The module is software, hardware, or a combination of software and hardware.

Figure 6:
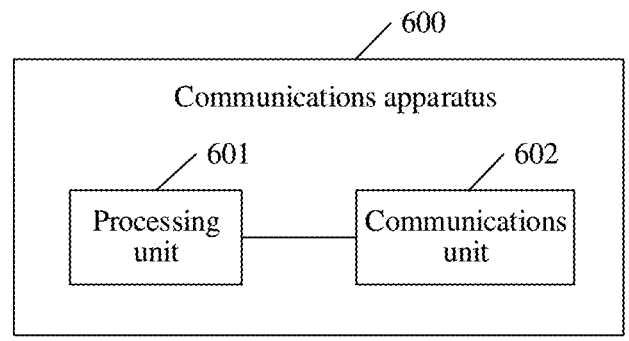
FIG. 6 is a schematic diagram of a structure of a communications apparatus according to at least one embodiment.

FIG. 6 is a schematic diagram of a structure of a communications apparatus according to at least one embodiment. The communications apparatus 600 shown in FIG. 6 includes a processing unit 601 and a communications unit 602.

In a design, the apparatus 600 is a network data analytics network element.

For example, the processing unit 601 is configured to determine a data source to which to-be-obtained data belongs, obtain first information, and determine, based on the first information, an object identifier that is of the data source and that is in an operation, administration, and maintenance OAM system. The communications unit 602 is configured to send a first request to the OAM system, where the first request includes the object identifier, and the first request is for requesting to obtain the to-be-obtained data.

In an implementation, the first information includes a correspondence between an identifier of the data source and the object identifier that is of the data source and that is in the OAM system.

In an implementation, the data source includes a network slice or a network slice subnet.

In an implementation, the first information is included in a network function profile. The network function profile includes one or more of the following: a correspondence between an identifier of the network slice and an object identifier that is of the network slice and that is in the OAM system; a correspondence between an identifier of the network slice and an object identifier that is of the network slice subnet in the network slice and that is in the OAM system; a correspondence between an identifier of the network slice subnet in the network slice and an object identifier that is of the network slice and that is in the OAM system; or a correspondence between an identifier of the network slice subnet in the network slice and an object identifier that is of the network slice subnet and that is in the OAM system.

In an implementation, the to-be-obtained data is a key performance indicator KPI of the network slice or a KPI of the network slice subnet.

In an implementation, the first information includes a generation rule of the object identifier that is of the data source and that is in the OAM system. In response to being configured to determine, based on the first information, the object identifier that is of the data source and that is in the OAM system, the processing unit 601 is specifically configured to generate, based on the generation rule and an identifier of the data source, the object identifier that is of the data source and that is in the OAM system.

In an implementation, the object identifier includes a first identifier and a second identifier, and the generation rule includes a first generation rule and a second generation rule. In response to being configured to generate, based on the generation rule and an identifier of the data source, the object identifier that is of the data source and that is in the OAM system, the processing unit 601 is specifically configured to generate the first identifier based on the first generation rule and a domain name of the network data analytics network element, and generate the second identifier based on the second generation rule and the identifier of the data source.

In an implementation, an identifier of the data source includes network slice selection assistance information and/or a network slice subnet identifier. The object identifier that is of the data source and that is in the OAM system includes a managed object identifier relating to network slice managed object identifier and/or a managed object identifier relating to network slice subnet.

In an implementation, the communications unit 602 is further configured to receive a second request, where the second request is for requesting to perform data analytics. The communications unit 602 is further configured to receive the to-be-obtained data from the OAM system. The processing unit 601 is further configured to perform data analytics based on the to-be-obtained data, to obtain an analytics result. In response to being configured to determine a data source to which to-be-obtained data belongs, the processing unit 601 is specifically configured to determine, based on the second request, the data source to which the to-be-obtained data belongs. In an implementation, the second request includes an identifier of the data source.

In an implementation, the first information includes a mapping rule between a domain name of the data source and the object identifier that is of the data source and that is in the OAM system. The processing unit 601 is further configured to obtain the domain name of the data source. In response to being configured to determine, based on the first information, an object identifier that is of the data source and that is in an OAM system, the processing unit 601 is specifically configured to obtain, through mapping from the domain name of the data source according to the mapping rule, the object identifier that is of the data source and that is in the OAM system.

In an implementation, the object identifier includes a third identifier and a fourth identifier. The first information specifically includes a first mapping rule between the domain name of the data source and the third identifier and a second mapping rule between a host name of the data source and the fourth identifier. The processing unit 601 is further configured to obtain the host name of the data source. In response to being configured to obtain, through mapping from the domain name of the data source according to the mapping rule, the object identifier that is of the data source and that is in the OAM system, the processing unit 601 is specifically configured to obtain the third identifier through mapping from the domain name of the data source according to the first mapping rule, and obtain the fourth identifier through mapping from the host name of the data source according to the second mapping rule.

In an implementation, in response to being configured to obtain the domain name of the data source, the processing unit 601 is specifically configured to invoke the communications unit 602 to send a third request to a network repository function NRF network element, where the third request is for requesting to obtain the domain name of the data source; and invoke the communications unit 602 to receive the domain name of the data source from the NRF network element.

In an implementation, in response to being configured to obtain first information, the processing unit 601 is specifically configured to obtain the first information from the OAM system or the NRF network element; obtain a network function profile from the OAM system or the NRF network element, where the network function profile includes the first information; or obtain the first information from a memory of the communications apparatus 600.

In an implementation, the network function profile is a configuration file of the communications apparatus 600 or a configuration file of a network slice selection network element.

In response to the apparatus 600 being the network data analytics network element, the apparatus 600 is configured to implement a function of the network data analytics network element in embodiments shown in FIG. 2 to FIG. 5.

In a design, the apparatus 600 is a management device in an OAM system. For example, the processing unit 601 is configured to generate first information. The first information is for determining an object identifier that is of a data source to which to-be-obtained data belongs and that is in the OAM system. The communications unit 602 is configured to send the first information to a first network element.

In an implementation, the first information includes a correspondence between an identifier of the data source and the object identifier that is of the data source and that is in the OAM system.

In an implementation, the data source includes a network slice or a network slice subnet.

In an implementation, the first information is included in a network function profile, and the network function profile includes one or more of the following:

a correspondence between an identifier of the network slice and an object identifier that is of the network slice and that is in the OAM system; a correspondence between an identifier of the network slice and an object identifier that is of the network slice subnet in the network slice and that is in the OAM system; a correspondence between an identifier of the network slice subnet in the network slice and an object identifier that is of the network slice and that is in the OAM system; or a correspondence between an identifier of the network slice subnet in the network slice and an object identifier that is of the network slice subnet and that is in the OAM system.

In an implementation, the to-be-obtained data is a key performance indicator KPI of the network slice or a KPI of the network slice subnet.

In an implementation, the first information includes a generation rule of the object identifier that is of the data source and that is in the OAM system.

In an implementation, the object identifier includes a first identifier and a second identifier. The generation rule includes a first generation rule and a second generation rule. The first generation rule includes a rule of generating the first identifier based on a domain name of a network data analytics network element. The second generation rule includes a rule of generating the second identifier based on an identifier of the data source.

In an implementation, an identifier of the data source includes network slice selection assistance information and/ or a network slice subnet identifier. The object identifier that is of the data source and that is in the OAM system includes a managed object identifier relating to network slice managed object identifier and/or a managed object identifier relating to network slice subnet.

In an implementation, the first information includes a mapping rule between a domain name of the data source and the object identifier that is of the data source and that is in the OAM system.

In an implementation, the object identifier includes a third identifier and a fourth identifier. The first information specifically includes a first mapping rule between the domain name of the data source and the third identifier and a second mapping rule between a host name of the data source and the fourth identifier.

In an implementation, in response to being configured to send the first information to a first network element, the communications unit 602 is specifically configured to send a configuration command to the first network element, where the configuration command includes the first information; or send network function profile to the first network element, where the network function profile includes the first information.

In an implementation, the network function profile is a configuration file of the network data analytics network element or a network slice selection network element.

In an implementation, the first network element includes one or more of the following: the network slice selection network element, a network repository function NRF network element, or the network data analytics network element.

In response to the apparatus 600 being the management device in the OAM system, the apparatus 600 is configured to implement a function of the management device in embodiments shown in FIG. 2 to FIG. 5.

Figure 7:
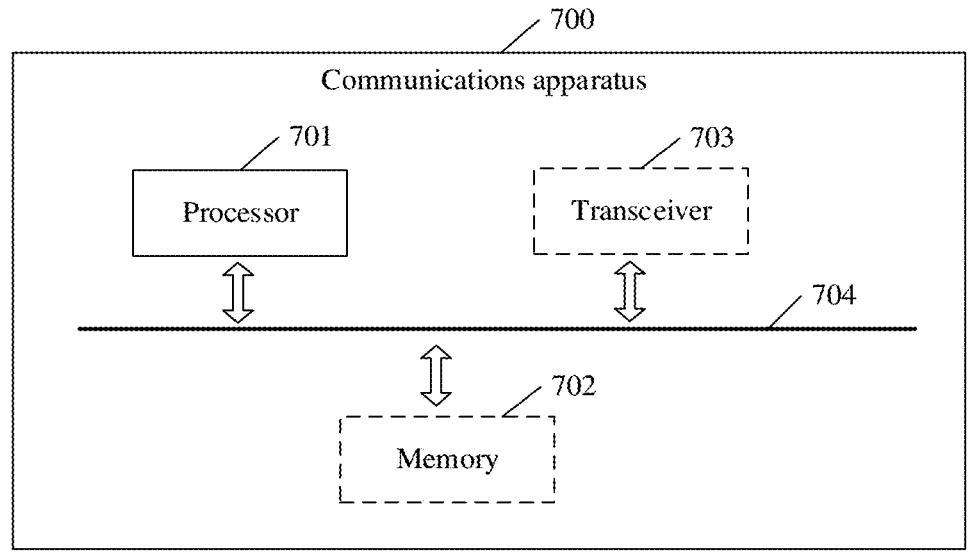
FIG. 7 is a schematic diagram of a structure of another communications apparatus according to at least one embodiment.

FIG. 7 is a schematic diagram of a structure of another communications apparatus according to at least one embodiment. The communications apparatus 700 shown in FIG. 7 includes at least one processor 701, a memory 702, and a transceiver 703.

The memory 702 is a volatile memory, for example, a random access memory.

Alternatively, the memory is a non-volatile memory, for example, a read-only memory, a flash memory, a hard disk drive (HDD), or a solid-state drive (SSD). Alternatively, the memory 702 is any other medium that is used to carry or store expected program code in an instruction or a data structure form and that is accessed by a computer. However, this is not limited thereto. The memory 702 is a combination of the foregoing memories.

A specific connection medium between the processor 701, the memory 702, and the transceiver 703 is not limited in at least one embodiment. In at least one embodiment, the transceiver 703, the memory 702, and the processor 701 are connected by using a bus 704 in the figure. The bus 704 is represented by using a bold line in the figure. A connection manner between other components is merely an example for description, and is not limited thereto. The bus 704 is classified into an address bus, a data bus, a control bus, and the like. For ease of representation, only one bold line is used for representation in FIG. 7, but this does not mean that there is only one bus or only one type of bus.

The processor 701 has a data sending/receiving function, and communicates with another device. In the apparatus shown in FIG. 7, an independent data communications unit, for example, the transceiver 703, is also disposed and is configured to send/receive data. In response to communicating with the another device, the processor 701 performs data transmission by using the transceiver 703.

It should be noted that, a dashed-line box in FIG. 7 indicates that the transceiver 703 is disposed separately from the processor 701, or the transceiver 703 is integrated into the processor 701; and the memory 702 is disposed separately from the processor 701, or the memory 702 is integrated into the processor 701.

In an example, in response to the form shown in FIG. 7 being used for a network data analytics network element, the processor in FIG. 7 invokes computer-executable instructions stored in the memory 702, to enable the network data analytics network element to perform the method performed by the network data analytics network element in any one of the foregoing method embodiments.

In an example, in response to the form shown in FIG. 7 being used for a management device in an OAM system, the processor in FIG. 7 invokes computer-executable instructions stored in the memory 702, to enable the management device to perform the method performed by the management device in any one of the foregoing method embodiments.

Specifically, functions/implementation processes of both the processing unit and the communications unit in FIG. 6 is implemented by the processor 701 in FIG. 7 by invoking the computer-executable instructions stored in the memory 702. Alternatively, a function/implementation process of the processing unit in FIG. 6 is implemented by the processor 701 in FIG. 7 by invoking the computer-executable instructions stored in the memory 702, and a function/implementation process of the communications unit in FIG. 6 is implemented by the transceiver 703 in FIG. 7.

In an implementation, the communications apparatus 700 includes a circuit, and the circuit implements a sending, receiving, or communications function in the foregoing method embodiments. The processor described in at least one embodiment is implemented in the following manners: an integrated circuit (IC), an analog IC, a radio frequency integrated circuit RFIC, a mixed signal IC, an application-specific integrated circuit (ASIC), a printed circuit board (PCB), an electronic device, or the like. The processor is alternatively manufactured by using the following IC craft technologies, for example, a complementary metal-oxide-semiconductor (CMOS), an N-type metal oxide semiconductor (NMOS), a P-channel metal oxide semiconductor (PMOS), a bipolar junction transistor (BJT), a bipolar CMOS (BiCMOS), silicon germanium (SiGe), or gallium arsenide (GaAs).

The communications apparatus described in the foregoing embodiments is the network data analytics network element or the management device in the OAM system. However, a scope of the communications apparatus described in at least one embodiment is not limited thereto, and the structure of the communications apparatus is not limited by FIG. 7. The communications apparatus is an independent device or is a part of a large device. For example, the communications apparatus is:

(1) an independent integrated circuit IC, a chip, or a chip system or subsystem;
(2) a set including one or more ICs, where optionally, the set of ICs further includes a storage component configured to store data and a computer program;
(3) an ASIC such as a modem;
(4) a module that is embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; or
(6) others.

Figure 8:
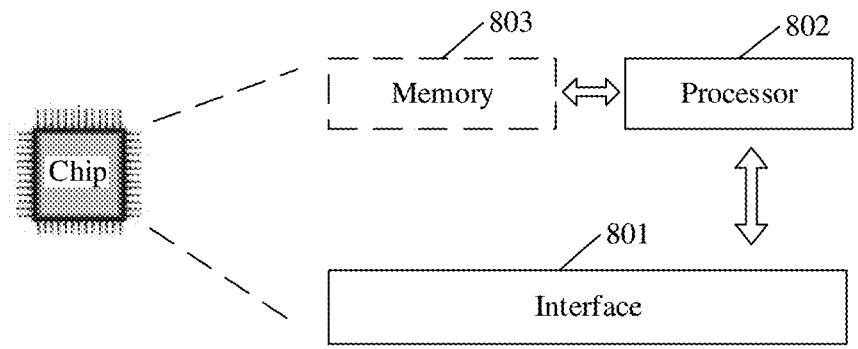
FIG. 8 is a schematic diagram of a structure of a chip according to at least one embodiment.

For a case in which the communications apparatus is the chip or the chip system, refer to a schematic diagram of a structure of a chip shown in FIG. 8. The chip shown in FIG. 8 includes an interface 801 and a processor 802. There is one or more interfaces 801, and there is a plurality of processors 802.

For a case in which the chip is configured to implement a function of the network data analytics network element in embodiments described herein:

The processor 802 is configured to determine a data source to which to-be-obtained data belongs, obtain first information, and determine, based on the first information, an object identifier that is of the data source and that is in an operation, administration, and maintenance OAM system. The interface 801 is configured to send a first request to the OAM system, where the first request includes the object identifier, and the first request is for requesting to obtain the to-be-obtained data.

In an implementation, the first information includes a correspondence between an identifier of the data source and the object identifier that is of the data source and that is in the OAM system.

In an implementation, the data source includes a network slice or a network slice subnet.

In an implementation, the first information is included in a network function profile. The network function profile includes one or more of the following: a correspondence between an identifier of the network slice and an object identifier that is of the network slice and that is in the OAM system; a correspondence between an identifier of the network slice and an object identifier that is of the network slice subnet in the network slice and that is in the OAM system; a correspondence between an identifier of the network slice subnet in the network slice and an object identifier that is of the network slice and that is in the OAM system; or a correspondence between an identifier of the network slice subnet in the network slice and an object identifier that is of the network slice subnet and that is in the OAM system.

In an implementation, the to-be-obtained data is a key performance indicator KPI of the network slice or a KPI of the network slice subnet.

In an implementation, the first information includes a generation rule of the object identifier that is of the data source and that is in the OAM system. In response to being configured to determine, based on the first information, the object identifier that is of the data source and that is in the OAM system, the processor 802 is specifically configured to generate, based on the generation rule and an identifier of the data source, the object identifier that is of the data source and that is in the OAM system.

In an implementation, the object identifier includes a first identifier and a second identifier, and the generation rule includes a first generation rule and a second generation rule. In response to being configured to generate, based on the generation rule and an identifier of the data source, the object identifier that is of the data source and that is in the OAM system, the processor 802 is specifically configured to generate the first identifier based on the first generation rule and a domain name of the network data analytics network element, and generate the second identifier based on the second generation rule and the identifier of the data source.

In an implementation, an identifier of the data source includes network slice selection assistance information and/or a network slice subnet identifier. The object identifier that is of the data source and that is in the OAM system includes a managed object identifier relating to network slice managed object identifier and/or a managed object identifier relating to network slice subnet.

In an implementation, the interface 801 is further configured to receive a second request, where the second request is for requesting to perform data analytics. The interface 801 is further configured to receive the to-be-obtained data from the OAM system. The processor 802 is further configured to perform data analytics based on the to-be-obtained data, to obtain an analytics result.

In response to being configured to determine a data source to which to-be-obtained data belongs, the processor 802 is specifically configured to determine, based on the second request, the data source to which the to-be-obtained data belongs.

In an implementation, the second request includes an identifier of the data source.

In an implementation, the first information includes a mapping rule between a domain name of the data source and the object identifier that is of the data source and that is in the OAM system. The processor 802 is further configured to obtain the domain name of the data source. In response to being configured to determine, based on the first information, an object identifier that is of the data source and that is in an OAM system, the processor 802 is specifically configured to obtain, through mapping from the domain name of the data source according to the mapping rule, the object identifier that is of the data source and that is in the OAM system.

In an implementation, the object identifier includes a third identifier and a fourth identifier. The first information specifically includes a first mapping rule between the domain name of the data source and the third identifier and a second mapping rule between a host name of the data source and the fourth identifier. The processor 802 is further configured to obtain the host name of the data source. In response to being configured to obtain, through mapping from the domain name of the data source according to the mapping rule, the object identifier that is of the data source and that is in the OAM system, the processor 802 is specifically configured to obtain the third identifier through mapping from the domain name of the data source according to the first mapping rule, and obtain the fourth identifier through mapping from the host name of the data source according to the second mapping rule.

In an implementation, in response to being configured to obtain the domain name of the data source, the processor 802 is specifically configured to invoke the interface 801 to send a third request to a network repository function NRF network element, where the third request is for requesting to obtain the domain name of the data source; and invoke the interface 801 to receive the domain name of the data source from the NRF network element.

In an implementation, in response to being configured to obtain first information, the processor 802 is specifically configured to obtain the first information from the OAM system or the NRF network element; obtain a network function profile from the OAM system or the NRF network element, where the network function profile includes the first information; or obtain the first information from a memory of the communications apparatus.

In an implementation, the network function profile is a configuration file of the communications apparatus or a configuration file of a network slice selection network element. Specifically, in this case, for operations performed by the interface 801 and the processor 802, refer to descriptions about the network data analytics network element in embodiments corresponding to FIG. 2 to FIG. 5.

For a case in which the chip is configured to implement a function of the management device in the OAM system in embodiments described herein:

The processor 802 is configured to generate first information. The first information is for determining an object identifier that is of a data source to which to-be-obtained data belongs and that is in the OAM system. The interface 801 is configured to send the first information to a first network element.

In an implementation, the first information includes a correspondence between an identifier of the data source and the object identifier that is of the data source and that is in the OAM system.

In an implementation, the data source includes a network slice or a network slice subnet.

In an implementation, the first information is included in a network function profile. The network function profile includes one or more of the following: a correspondence between an identifier of the network slice and an object identifier that is of the network slice and that is in the OAM system; a correspondence between an identifier of the network slice and an object identifier that is of the network slice subnet in the network slice and that is in the OAM system; a correspondence between an identifier of the network slice subnet in the network slice and an object identifier that is of the network slice and that is in the OAM system; or a correspondence between an identifier of the network slice subnet in the network slice and an object identifier that is of the network slice subnet and that is in the OAM system.

In an implementation, the to-be-obtained data is a key performance indicator KPI of the network slice or a KPI of the network slice subnet.

In an implementation, the first information includes a generation rule of the object identifier that is of the data source and that is in the OAM system.

In an implementation, the object identifier includes a first identifier and a second identifier. The generation rule includes a first generation rule and a second generation rule. The first generation rule includes a rule of generating the first identifier based on a domain name of a network data analytics network element. The second generation rule includes a rule of generating the second identifier based on an identifier of the data source.

In an implementation, an identifier of the data source includes network slice selection assistance information and/or a network slice subnet identifier. The object identifier that is of the data source and that is in the OAM system includes a managed object identifier relating to network slice managed object identifier and/or a managed object identifier relating to network slice subnet.

In an implementation, the first information includes a mapping rule between a domain name of the data source and the object identifier that is of the data source and that is in the OAM system.

In an implementation, the object identifier includes a third identifier and a fourth identifier. The first information specifically includes a first mapping rule between the domain name of the data source and the third identifier and a second mapping rule between a host name of the data source and the fourth identifier.

In an implementation, in response to being configured to send the first information to a first network element, the interface 801 is specifically configured to send a configuration command to the first network element, where the configuration command includes the first information; or send network function profile to the first network element, where the network function profile includes the first information.

In an implementation, the network function profile is a configuration file of the network data analytics network element or a network slice selection network element.

In an implementation, the first network element includes one or more of the following: the network slice selection network element, a network repository function NRF network element, or the network data analytics network element.

Specifically, in this case, for operations performed by the interface 801 and the processor 802, refer to descriptions about the management device in embodiments corresponding to FIG. 2 to FIG. 5.

Optionally, the chip further includes a memory 803, and the memory 803 is configured to store a computer program and data that are used. The memory 803 is separately disposed, or is integrated with the processor 802, as shown in a dashed-line box in FIG. 8.

A person skilled in the art further understands that various illustrative logical blocks (illustrative logic blocks) and steps that are listed in embodiments described herein is implemented by using electronic hardware, computer software, or a combination thereof. Whether the functions are implemented by using hardware or software depends on particular applications and a design of the entire system. A person skilled in the art uses various methods to implement the described functions for each particular application, but the implementation is not considered to go beyond the scope of embodiments described herein.

An at least one embodiment further provides a data obtaining system. The system includes one or more of the network data analytics network element and the management device in the OAM system in embodiments corresponding to FIG. 2 to FIG. 5. Optionally, the system further includes the network slice selection network element and/or the network repository function NRF network element in embodiments corresponding to FIG. 2 to FIG. 5.

At least one embodiment further provides a computer-readable storage medium. The computer-readable storage medium stores a computer program. The computer program product includes program instructions. In response to the program instructions being executed by a computer, a function of any one of the foregoing method embodiments is implemented.

The computer-readable storage medium includes but is not limited to a flash memory, a hard disk, and a solid-state drive.

At least one embodiment further provides a computer program product. In response to the computer program product being executed by a computer, functions of any one of the foregoing method embodiments are implemented.

In some scenarios, some optional features in embodiments described herein is independently implemented without depending on another feature, for example, a solution on which the optional features are currently based, to resolve a corresponding technical problem and achieve a corresponding effect. Alternatively, in some scenarios, the optional features is combined with other features based on usage. Correspondingly, the apparatus provided in embodiments described herein also correspondingly implements these features or functions. Details are not described herein.

A person skilled in the art further understands that various illustrative logical blocks (illustrative logical blocks) and steps that are listed in embodiments described herein is implemented by electronic hardware, computer software, or a combination thereof. Whether the functions are implemented by using hardware or software depends on particular applications and a design of the entire system. A person skilled in the art uses various methods to implement the functions for corresponding application, but the implementation is not considered to go beyond the protection scope of embodiments described herein.

The solutions described in at least one embodiment is implemented in various manners. For example, the technologies is implemented by hardware, software, or a combination thereof. For hardware implementation, a processing unit configured to execute these technologies at a communications apparatus (for example, a base station, a terminal, a network entity, a core network element, or a chip) is implemented in one or more general-purpose processors, digital signal processors (DSP), digital signal processor components, or application-specific integrated circuits (ASIC), programmable logic devices, field programmable gate arrays (FPGA), or another programmable logic apparatus, discrete gate or transistor logic, discrete hardware component, or any combination thereof. The general-purpose processor is a microprocessor. Optionally, the general-purpose processor is also any conventional processor, controller, microcontroller, or state machine. The processor is also implemented by a combination of computing apparatuses, such as a digital signal processor and a microprocessor, multiple microprocessors, one or more microprocessors with a digital signal processor core, or any other similar configuration.

The memory in at least one embodiment is a volatile memory or a nonvolatile memory, or includes a volatile memory and a nonvolatile memory. The nonvolatile memory is a read-only memory (ROM), a programmable read-only memory (PROM), an erasable programmable read-only memory (EPROM), an electrically erasable programmable read-only memory (EEPROM), or a flash memory. The volatile memory is a random access memory (RAM), used as an external cache. Through example but not limitative description, many forms of RAMs is used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). The memory of the systems and methods described in at least one embodiment includes but is not limited to these and any memory of another proper type.

All or some of the foregoing embodiments is implemented by using software, hardware, firmware, or any combination thereof. In response to software being used to implement embodiments, all or a part of embodiments is implemented in a form of a computer program product. The computer program product includes one or more computer instructions. In response to the computer instructions being loaded and executed on the computer, the procedure or functions according to embodiments described herein are all or partially generated. The computer is a general-purpose computer, a dedicated computer, a computer network, or other programmable apparatuses. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible by the computer, or a data storage device, for example, a server or a data center, integrating one or more usable media. The usable medium is a magnetic medium (for example, a floppy disk, a hard disk, or a magnetic tape), an optical medium (for example, a high-density digital video disc (DVD)), a semiconductor medium (for example, a solid-state drive (SSD)), or the like.

"An embodiment" mentioned in the entire specification means that particular features, structures, or characteristics related to the embodiment are included in at least one at least one embodiment. Therefore, embodiments in the entire specification do not necessarily refer to a same embodiment. In addition, these particular features, structures, or characteristics is combined in one or more embodiments by using any appropriate manner. Sequence numbers of the foregoing processes do not mean an execution sequence in various embodiments described herein. The execution sequence of the processes should be determined based on functions and internal logic of the processes, and should not be construed as any limitation on the implementation processes of embodiments described herein.

In at least one embodiment, "when" and "if" mean that an apparatus performs corresponding processing in an objective situation, and are not intended to limit time. The terms do not mean that the apparatus is to have a determining action during implementation, and do not mean any other limitation.

In at least one embodiment, an element represented in a singular form is intended to represent "one or more", but does not represent "only one", unless otherwise specified. In at least one embodiment, unless otherwise specified, "at least one" is intended to represent "one or more", and "a plurality of" is intended to represent "two or more".

In addition, the terms "system" and "network" is used interchangeably in embodiments described herein. The term "and/or" in embodiments described herein describes only an association relationship between associated objects and represents that three relationships exist. For example, A and/or B represent the following three cases: only A exists, both A and B exist, and only B exists. A is singular or plural, and B is singular or plural.

"Predefine" in at least one embodiment is understood as "define", "predefine", "store", "pre-store", "pre-negotiate", "pre-configure", "solidify", or "pre-burn".

A person of ordinary skill in the art understands that, for the purpose of convenient and brief description, for a detailed working process of the foregoing system, apparatuses, and units, refer to a corresponding process in the foregoing method embodiments. Details are not described herein again.

For same or similar parts in embodiments described herein, refer to each other. In embodiments described herein and the implementations/implementation methods/implementation manners in embodiments, unless otherwise specified or a logical conflict occurs, terms and/or descriptions are consistent and is mutually referenced between different embodiments and between the implementations/implementation methods/implementation manners in embodiments. Technical features in the different embodiments and the implementations/implementation methods/implementation manners in embodiments is combined to form a new embodiment, implementation, implementation manner, or implementation method based on an internal logical relationship thereof. The foregoing descriptions are implementations of at least one embodiment, but are not intended to limit the protection scope of embodiments described herein.

The foregoing descriptions are merely specific implementations of at least one embodiment, but are not intended to limit the protection scope of embodiments described herein. Any variation or replacement readily figured out by a person skilled in the art within the technical scope disclosed in at least one embodiment shall fall within the protection scope of embodiments described herein.

What is claimed is:

1. A data obtaining method, wherein the method comprises:
   determining, by a network data analytics network element, a data source to which to-be-obtained data belongs;
   obtaining, by the network data analytics network element, first information;
   determining, by the network data analytics network element based on the first information, an object identifier, wherein the object identifier is usable to identify a managed object managed by an operation, administration, and maintenance (OAM) system, wherein the data source maps to the managed object; and
   sending, by the network data analytics network element, a first request to the OAM system, wherein the first request includes the object identifier, and wherein the first request is usable for requesting to obtain the to-be-obtained data.

2. The method according to claim 1, wherein the obtaining, by the network data analytics network element, the first information includes obtaining the first information that includes a correspondence between an identifier of the data source and the object identifier.

3. The method according to claim 2, wherein the data source includes a network slice or a network slice subnet.

4. The method according to claim 3, wherein the first information is comprised in a network function profile, and the network function profile includes one or more of the following:
   a correspondence between an identifier of the network slice and an object identifier for identifying a managed object to which the network slice mapped, wherein the managed object is managed by the OAM system;
   a correspondence between an identifier of the network slice and an object identifier for identifying a managed object to which a network slice subnet in the network slice mapped, wherein the managed object is managed by the OAM system;
   a correspondence between an identifier of the network slice subnet in the network slice and an object identifier for identifying a managed object to which the network slice mapped, wherein the managed object is managed by OAM system; or
   a correspondence between an identifier of the network slice subnet in the network slice and an object identifier for identifying a managed object to which the network slice subnet mapped, wherein the managed object is managed by the OAM system.

5. The method according to claim 3, wherein the to-be-obtained data is a key performance indicator (KPI) of the network slice or a KPI of the network slice subnet.

6. The method according to claim 1, wherein:
   the first information comprises a generation rule of the object identifier; and the determining, by the network data analytics network element based on the first information, the object identifier comprises:
   generating, by the network data analytics network element based on the generation rule and an identifier of the data source, the object identifier;
   or,
   the first information comprises a mapping rule between a domain name of the data source and the object identifier; the method further comprises:
   obtaining, by the network data analytics network element, the domain name of the data source; and
   the determining, by the network data analytics network element based on the first information, the object identifier comprises:
   obtaining, by the network data analytics network element through mapping from the domain name of the data source according to the mapping rule, the object identifier.

7. The method according to claim 1, wherein an identifier of the data source includes at least one of network slice selection assistance information or a network slice subnet identifier, wherein the object identifier comprises at least one of a managed object identifier relating to network slice or a managed object identifier relating to network slice subnet.

8. The method according to claim 1, wherein the method further comprises:
   receiving, by the network data analytics network element, a second request, wherein the second request is for requesting to perform data analytics;
   receiving, by the network data analytics network element, the to-be-obtained data from the OAM system; and
   performing, by the network data analytics network element, data analytics based on the to-be-obtained data, to obtain an analytics result,
   wherein the determining, by the network data analytics network element, the data source to which to-be-obtained data belongs includes: determining, by the network data analytics network element based on the second request, the data source to which the to-be-obtained data belongs.

9. The method according to claim 8, wherein the second request includes an identifier of the data source.

10. A data obtaining method, applied to an operation, administration, and maintenance (OAM) system, wherein the OAM system includes a management device, the method comprises:
  generating, by the management device, first information, wherein the first information is for determining an object identifier, wherein the object identifier is usable to identify a managed object managed by an operation, administration, and maintenance (OAM) system, wherein a data source maps to the managed object; and
  sending, by the management device, the first information to a first network element.

11. The method according to claim 10, wherein the first information includes a correspondence between an identifier of the data source and the object identifier.

12. The method according to claim 11, wherein the data source comprises a network slice or a network slice subnet.

13. The method according to claim 12, wherein the first information is comprised in a network function profile, and the network function profile comprises one or more of the following:
  a correspondence between an identifier of the network slice and an object identifier for identifying a managed object to which the network slice mapped, wherein the managed object is managed by the OAM system;
  a correspondence between the identifier of the network slice and the object identifier for identifying a managed object to which a network slice subnet in the network slice mapped, wherein the managed object is managed by the OAM system;
  a correspondence between the identifier of the network slice subnet in the network slice and the object identifier for identifying a managed object to which the network slice mapped, wherein the managed object is managed by the OAM system; or
  a correspondence between the identifier of the network slice subnet in the network slice and the object identifier for identifying a managed object to which the network slice subnet mapped, wherein the managed object is managed by the OAM system.

14. The method according to claim 12, wherein to-be-obtained data is a key performance indicator (KPI) of the network slice or a KPI of the network slice subnet.

15. The method according to claim 10, wherein the first information comprises a generation rule of the object identifier; or,
  the first information comprises a mapping rule between a domain name of the data source and the object identifier.

16. The method according to claim 15, wherein when the first information comprising a generation rule of the object identifier, the object identifier comprises a first identifier and a second identifier, and the generation rule includes a first generation rule and a second generation rule, wherein the first generation rule comprises a rule of generating the first identifier based on a domain name of a network data analytics network element, and the second generation rule includes a rule of generating the second identifier based on an identifier of the data source;
  or, when the first information comprising a mapping rule between a domain name of the data source and the object identifier, wherein the object identifier includes a third identifier and a fourth identifier, and the first information comprises a first mapping rule between the domain name of the data source and the third identifier and a second mapping rule between a host name of the data source and the fourth identifier.

17. The method according to claim 10, wherein an identifier of the data source comprises at least one of network slice selection assistance information or a network slice subnet identifier, wherein the object identifier comprises at least one of a managed object identifier relating to network slice or a managed object identifier relating to network slice subnet.

18. A communications apparatus, comprising:
  at least one memory storing program instructions; and
  at least one processor coupled to the at least one memory, wherein the at least one processor is configured to execute the program instructions to perform the operations for:
  determining a data source to which to-be-obtained data belongs;
  obtaining first information;
  determining based on the first information, an object identifier, wherein the object identifier is usable to identify a managed object managed by an operation, administration, and maintenance (OAM) system, wherein the data source maps to the managed object; and
  sending a first request to the OAM system, wherein the first request comprises the object identifier, and the first request is for requesting to obtain the to-be-obtained data.

19. The communications apparatus according to claim 18, wherein the first information includes a correspondence between an identifier of the data source and the object identifier.

20. The communications apparatus according to claim 19, wherein the data source includes a network slice or a network slice subnet.

* * * * *